US005841053A

United States Patent [19]

Johnson et al.

[11] Patent Number: 5,841,053

[45] Date of Patent: Nov. 24, 1998

[54] SIMPLIFIED KEYBOARD AND ELECTRONIC MUSICAL INSTRUMENT

[76] Inventors: Gerald L. Johnson, 6714 Pomona, Boise, Id. 83704; Joseph T. Pawlowski, 12171 W. Musket Dr., Boise, Id. 83713

[21] Appl. No.: 623,485

[22] Filed: Mar. 28, 1996

[51] Int. Cl.[6] .............................. G09B 15/02; G10C 3/12; G10H 7/00

[52] U.S. Cl. ............................ 84/615; 84/645; 84/423 R; 84/451; 84/478

[58] Field of Search .............................. 84/613, 615–620, 84/637, 645, 650, 669, 423 R, 451, 477 R, 478, 630, DIG. 25, DIG. 26

[56] References Cited

U.S. PATENT DOCUMENTS

| | | | |
|---|---|---|---|
| 3,973,460 | 8/1976 | Coles | 84/451 X |
| 4,048,893 | 9/1977 | Coles | 84/451 X |
| 4,300,430 | 11/1981 | Bione et al. | 84/1.01 |
| 4,499,807 | 2/1985 | Ishida | 84/1.03 |
| 5,099,738 | 3/1992 | Hotz | 84/645 X |
| 5,216,188 | 6/1993 | Shibukawa | 84/637 |
| 5,367,117 | 11/1994 | Kikuchi | 84/603 |
| 5,414,209 | 5/1995 | Morita | 84/615 |
| 5,440,071 | 8/1995 | Johnson | 84/637 |

*Primary Examiner*—Stanley J. Witkowski
*Attorney, Agent, or Firm*—Frank J. Dykas

[57] ABSTRACT

Disclosed is an electronic musical instrument comprised of operators organized in repeating patterns of seven. The operators are electronically interpreted to correspond only to the valid notes of a selected scale. The repeating patterns of seven notes directly corresponds to the vast majority of mucis theory and thus constitutes an enormous simplification in the art of learning, performing and composing music. The present invention enables users of the electronic musical instrument to master chord and note progressions in any scale and mode by learning only a single set of note patterns, in contrast to the myriad scales, chord and note patterns which must be learned on traditional keyboard and pedal devices.

40 Claims, 23 Drawing Sheets

| IONIAN MODE=DIATONIC MAJOR SCALE=C MAJOR SCALE | | | | | | | | | | | | | | | | | | | | | | |
|---|---|---|---|---|---|---|---|---|---|---|---|---|---|---|---|---|---|---|---|---|---|---|
| SEMITONE NUMBER | 1 | 2 | 3 | 4 | 5 | 6 | 7 | 8 | 9 | 10 | 11 | 12 | 1 | 2 | 3 | 4 | 5 | 6 | 7 | 8 | 9 | 10 |
| VALID NOTES | C | | D | | E | F | | G | | A | | B | C | | D | | E | F | | G | | A |
| KEYBOARD NOTE NUMBER | 1 | | 2 | | 3 | 4 | | 5 | | 6 | | 7 | 8 | | 9 | | 10 | 11 | | 12 | | 13 |
| | | | | | | | | | | | | | | | | | | | | | | |
| IMPORTANT CHORDS | KEYS | | | | | NOTES | | | | | | | | | | | | | | | | |
| CMAJOR | 1 | 3 | 5 | | | C | E | G | | | | | | | | | | | | | | |
| DMINOR | 2 | 4 | 6 | | | D | F | A | | | | | | | | | | | | | | |
| EMINOR | 3 | 5 | 7 | | | E | G | B | | | | | | | | | | | | | | |
| FMAJOR | 4 | 6 | 8 | | | F | A | C | | | | | | | | | | | | | | |
| GMAJOR | 5 | 7 | 9 | | | G | B | D | | | | | | | | | | | | | | |
| AMINOR | 6 | 8 | 10 | | | A | C | E | | | | | | | | | | | | | | |
| BDIMINISHED | 7 | 9 | 11 | | | B | D | F | | | | | | | | | | | | | | |
| | | | | | | | | | | | | | | | | | | | | | | |
| | | | | | | | | | | | | | | | | | | | | | | |
| | | | | | | | | | | | | | | | | | | | | | | |
| CMAJOR SEVENTH | 1 | 3 | 5 | 7 | | C | E | G | B | | | | | | | | | | | | | |
| DMINOR SEVENTH | 2 | 4 | 6 | 8 | | D | F | A | C | | | | | | | | | | | | | |
| EMINOR SEVENTH | 3 | 5 | 7 | 9 | | E | G | B | D | | | | | | | | | | | | | |
| FMAJOR SEVENTH | 4 | 6 | 8 | 10 | | F | A | C | E | | | | | | | | | | | | | |
| GDOMINANT MAJOR SEVENTH | 5 | 7 | 9 | 11 | | G | B | D | F | | | | | | | | | | | | | |
| AMINOR SEVENTH | 6 | 8 | 10 | 12 | | A | C | E | G | | | | | | | | | | | | | |
| BHALF DIMINISHED FLAT SEVENTH | 7 | 9 | 11 | 13 | | B | D | F | A | | | | | | | | | | | | | |

FIG. 3A

| MIXOLYDIAN MODE, KEY OF C | | | | | | | | | | | | | | | | | | | | | | |
|---|---|---|---|---|---|---|---|---|---|---|---|---|---|---|---|---|---|---|---|---|---|---|
| SEMITONE NUMBER | 1 | 2 | 3 | 4 | 5 | 6 | 7 | 8 | 9 | 10 | 11 | 12 | 1 | 2 | 3 | 4 | 5 | 6 | 7 | 8 | 9 | 10 |
| VALID NOTES | C | | D | | E | F | | G | | A | Bb | | C | | D | | E | F | | G | | A |
| KEYBOARD NOTE NUMBER | 1 | | 2 | | 3 | 4 | | 5 | | 6 | 7 | | 8 | | 9 | | 10 | 11 | | 12 | | 13 |
| | | | | | | | | | | | | | | | | | | | | | | |
| IMPORTANT CHORDS | KEYS | | | | | NOTES | | | | | | | | | | | | | | | | |
| CMAJOR | 1 | 3 | 5 | | | C | E | G | | | | | | | | | | | | | | |
| DMINOR | 2 | 4 | 6 | | | D | F | A | | | | | | | | | | | | | | |
| EM-5 | 3 | 5 | 7 | | | E | G | Bb | | | | | | | | | | | | | | |
| FMAJOR | 4 | 6 | 8 | | | F | A | C | | | | | | | | | | | | | | |
| GMINOR | 5 | 7 | 9 | | | G | Bb | D | | | | | | | | | | | | | | |
| AMINOR | 6 | 8 | 10 | | | A | C | E | | | | | | | | | | | | | | |
| BbMAJOR | 7 | 9 | 11 | | | Bb | D | F | | | | | | | | | | | | | | |
| | | | | | | | | | | | | | | | | | | | | | | |
| | | | | | | | | | | | | | | | | | | | | | | |
| | | | | | | | | | | | | | | | | | | | | | | |
| CDOMINANTMAJOR SEVENTH | 1 | 3 | 5 | 7 | | C | E | G | Bb | | | | | | | | | | | | | |
| DMINOR SEVENTH | 2 | 4 | 6 | 8 | | D | F | A | C | | | | | | | | | | | | | |
| EM7-5 | 3 | 5 | 7 | 9 | | E | G | Bb | D | | | | | | | | | | | | | |
| FMAJOR SEVENTH | 4 | 6 | 8 | 10 | | F | A | C | E | | | | | | | | | | | | | |
| GMINOR SEVENTH | 5 | 7 | 9 | 11 | | G | Bb | D | F | | | | | | | | | | | | | |
| AMINOR SEVENTH | 6 | 8 | 10 | 12 | | A | C | E | G | | | | | | | | | | | | | |
| BbMAJOR SEVENTH | 7 | 9 | 11 | 13 | | Bb | D | F | A | | | | | | | | | | | | | |

FIG. 3B

| DORIAN MODE, KEY OF C | | | | | | | | | | | | | | | | | | | | | | |
|---|---|---|---|---|---|---|---|---|---|---|---|---|---|---|---|---|---|---|---|---|---|---|
| SEMITONE NUMBER | 1 | 2 | 3 | 4 | 5 | 6 | 7 | 8 | 9 | 10 | 11 | 12 | 1 | 2 | 3 | 4 | 5 | 6 | 7 | 8 | 9 | 10 |
| VALID NOTES | C | | D | Eb | | F | | G | | A | Bb | | C | | D | Eb | | F | | G | | A |
| KEYBOARD NOTE NUMBER | 1 | | 2 | 3 | | 4 | | 5 | | 6 | 7 | | 8 | | 9 | 10 | | 11 | | 12 | | 13 |
| | | | | | | | | | | | | | | | | | | | | | | |
| IMPORTANT CHORDS | KEYS | | | | | NOTES | | | | | | | | | | | | | | | | |
| CMINOR | 1 | 3 | 5 | | | C | Eb | G | | | | | | | | | | | | | | |
| DMINOR | 2 | 4 | 6 | | | D | F | A | | | | | | | | | | | | | | |
| EbMAJOR | 3 | 5 | 7 | | | Eb | G | Bb | | | | | | | | | | | | | | |
| FMAJOR | 4 | 6 | 8 | | | F | A | C | | | | | | | | | | | | | | |
| GMINOR | 5 | 7 | 9 | | | G | Bb | D | | | | | | | | | | | | | | |
| (NOT NORMALLY USED) | 6 | 8 | 10 | | | A | C | Eb | | | | | | | | | | | | | | |
| BbMAJOR | 7 | 9 | 11 | | | Bb | D | F | | | | | | | | | | | | | | |
| | | | | | | | | | | | | | | | | | | | | | | |
| | | | | | | | | | | | | | | | | | | | | | | |
| | | | | | | | | | | | | | | | | | | | | | | |
| CMINOR SEVENTH | 1 | 3 | 5 | 7 | | C | Eb | G | Bb | | | | | | | | | | | | | |
| DMINOR SEVENTH | 2 | 4 | 6 | 8 | | D | F | A | C | | | | | | | | | | | | | |
| EbMAJOR SEVENTH | 3 | 5 | 7 | 9 | | Eb | G | Bb | D | | | | | | | | | | | | | |
| FDOMINANT MAJOR SEVENTH | 4 | 6 | 8 | 10 | | F | A | C | Eb | | | | | | | | | | | | | |
| GMINOR SEVENTH | 5 | 7 | 9 | 11 | | G | Bb | D | F | | | | | | | | | | | | | |
| AM7-5 | 6 | 8 | 10 | 12 | | A | C | Eb | G | | | | | | | | | | | | | |
| BbMAJOR SEVENTH | 7 | 9 | 11 | 13 | | Bb | D | F | A | | | | | | | | | | | | | |

FIG. 3C

| PHRYGIAN MODE, KEY OF C | | | | | | | | | | | | | | | | | | | | | | |
|---|---|---|---|---|---|---|---|---|---|---|---|---|---|---|---|---|---|---|---|---|---|---|
| SEMITONE NUMBER | 1 | 2 | 3 | 4 | 5 | 6 | 7 | 8 | 9 | 10 | 11 | 12 | 1 | 2 | 3 | 4 | 5 | 6 | 7 | 8 | 9 | 10 |
| VALID NOTES | C | Db | | Eb | | F | | G | Ab | | Bb | | C | Db | | Eb | | F | | G | Ab | |
| NOTE NUMBER | 1 | 2 | | 3 | | 4 | | 5 | 6 | | 7 | | 8 | 9 | | 10 | | 11 | | 12 | 13 | |
| | | | | | | | | | | | | | | | | | | | | | | |
| IMPORTANT CHORDS | KEYS | | | | | NOTES | | | | | | | | | | | | | | | | |
| CMINOR | 1 | 3 | 5 | | | C | Eb | G | | | | | | | | | | | | | | |
| DbMAJOR | 2 | 4 | 6 | | | Db | F | Ab | | | | | | | | | | | | | | |
| EbMAJOR | 3 | 5 | 7 | | | Eb | G | Bb | | | | | | | | | | | | | | |
| FMINOR | 4 | 6 | 8 | | | F | Ab | C | | | | | | | | | | | | | | |
| (NOT NORMALLY USED) | 5 | 7 | 9 | | | G | Bb | Db | | | | | | | | | | | | | | |
| AMAJOR | 6 | 8 | 10 | | | Ab | C | Eb | | | | | | | | | | | | | | |
| BbMINOR | 7 | 9 | 11 | | | Bb | Db | F | | | | | | | | | | | | | | |
| | | | | | | | | | | | | | | | | | | | | | | |
| | | | | | | | | | | | | | | | | | | | | | | |
| | | | | | | | | | | | | | | | | | | | | | | |
| CMINOR SEVENTH | 1 | 3 | 5 | 7 | | C | Eb | G | Bb | | | | | | | | | | | | | |
| DbMAJOR SEVENTH | 2 | 4 | 6 | 8 | | Db | F | Ab | C | | | | | | | | | | | | | |
| EbDOMINANT MAJOR SEVENTH | 3 | 5 | 7 | 9 | | Eb | G | Bb | Db | | | | | | | | | | | | | |
| FMINOR SEVENTH | 4 | 6 | 8 | 10 | | F | Ab | C | Eb | | | | | | | | | | | | | |
| GM7-5 | 5 | 7 | 9 | 11 | | G | Bb | Db | F | | | | | | | | | | | | | |
| AbMAJOR SEVENTH | 6 | 8 | 10 | 12 | | Ab | C | Eb | G | | | | | | | | | | | | | |
| BbDOMINANT MAJOR SEVENTH | 7 | 9 | 11 | 13 | | Bb | D | F | Ab | | | | | | | | | | | | | |

FIG. 3D

| CHARMONIC MINOR SCALE | | | | | | | | | | | | | | | | | | | | | | |
|---|---|---|---|---|---|---|---|---|---|---|---|---|---|---|---|---|---|---|---|---|---|---|
| SEMITONE NUMBER | 1 | 2 | 3 | 4 | 5 | 6 | 7 | 8 | 9 | 10 | 11 | 12 | 1 | 2 | 3 | 4 | 5 | 6 | 7 | 8 | 9 | 10 |
| NOTES | C | | D | Eb | | F | | G | Ab | | | B | C | | D | Eb | | F | | G | Ab | |
| KEYBOARD KEY NUMBER | 1 | | 2 | 3 | | 4 | | 5 | 6 | | | 7 | 8 | | 9 | 10 | | 11 | | 12 | 13 | |
| | | | | | | | | | | | | | | | | | | | | | | |
| IMPORTANT CHORDS | KEYS | | | | | NOTES | | | | | | | | | | | | | | | | |
| CMINOR | 1 | 3 | 5 | | | C | Eb | G | | | | | | | | | | | | | | |
| (NOT NORMALLY USED) | 2 | 4 | 6 | | | D | F | Ab | | | | | | | | | | | | | | |
| Eb+5 | 3 | 5 | 7 | | | Eb | G | B | | | | | | | | | | | | | | |
| FMINOR | 4 | 6 | 8 | | | F | Ab | C | | | | | | | | | | | | | | |
| GMAJOR | 5 | 7 | 9 | | | G | B | D | | | | | | | | | | | | | | |
| AbMAJOR | 6 | 8 | 10 | | | Ab | C | Eb | | | | | | | | | | | | | | |
| BDIMINISHED | 7 | 9 | 11 | | | B | D | F | | | | | | | | | | | | | | |
| | | | | | | | | | | | | | | | | | | | | | | |
| | | | | | | | | | | | | | | | | | | | | | | |
| | | | | | | | | | | | | | | | | | | | | | | |
| CMINOR SEVENTH | 1 | 3 | 5 | 7 | | C | Eb | G | B | | | | | | | | | | | | | |
| DHALF DIMINISHED SEVENTH | 2 | 4 | 6 | 8 | | D | F | Ab | C | | | | | | | | | | | | | |
| EbMAJOR SEVENTH AUGMENTED FIFTH | 3 | 5 | 7 | 9 | | Eb | G | B | D | | | | | | | | | | | | | |
| FMINOR SEVENTH | 4 | 6 | 8 | 10 | | F | Ab | C | Eb | | | | | | | | | | | | | |
| GDOMINANT MAJOR SEVENTH | 5 | 7 | 9 | 11 | | G | B | D | F | | | | | | | | | | | | | |
| AbMAJOR SEVENTH | 6 | 8 | 10 | 12 | | Ab | C | Eb | G | | | | | | | | | | | | | |
| BDIMINISHED SEVENTH | 7 | 9 | 11 | 13 | | B | D | F | Ab | | | | | | | | | | | | | |

FIG. 3E

| HARMONIC MINOR SCALE, KEY OF A | | | | | | | | | | | | | | | | | | | | | | |
|---|---|---|---|---|---|---|---|---|---|---|---|---|---|---|---|---|---|---|---|---|---|---|
| SEMITONE NUMBER | 1 | 2 | 3 | 4 | 5 | 6 | 7 | 8 | 9 | 10 | 11 | 12 | 1 | 2 | 3 | 4 | 5 | 6 | 7 | 8 | 9 | 10 |
| VALID NOTES | A | | B | C | | D | | E | F | | | G# | A | | B | C | | D | | E | F | |
| KEYBOARD KEY NUMBER | 1 | | 2 | 3 | | 4 | | 5 | 6 | | | 7 | 8 | | 9 | 10 | | 11 | | 12 | 13 | |
| | | | | | | | | | | | | | | | | | | | | | | |
| IMPORTANT CHORDS | KEYS | | | | | NOTES | | | | | | | | | | | | | | | | |
| AMINOR | 1 | 3 | 5 | | | A | C | E | | | | | | | | | | | | | | |
| (NOT NORMALLY USED) | 2 | 4 | 6 | | | B | D | F | | | | | | | | | | | | | | |
| C+5 | 3 | 5 | 7 | | | C | E | G# | | | | | | | | | | | | | | |
| DMINOR | 4 | 6 | 8 | | | D | F | A | | | | | | | | | | | | | | |
| EMAJOR | 5 | 7 | 9 | | | E | G# | B | | | | | | | | | | | | | | |
| FMAJOR | 6 | 8 | 10 | | | F | A | C | | | | | | | | | | | | | | |
| AbDIMINISHED | 7 | 9 | 11 | | | G# | B | D | | | | | | | | | | | | | | |
| AMINOR SEVENTH | 1 | 3 | 5 | 7 | | A | C | E | G# | | | | | | | | | | | | | |
| BHALF DIMINISHED SEVENTH | 2 | 4 | 6 | 8 | | B | D | F | A | | | | | | | | | | | | | |
| CMAJOR SEVENTH AUGMENTED FIFTH | 3 | 5 | 7 | 9 | | C | E | G# | B | | | | | | | | | | | | | |
| DMINOR SEVENTH | 4 | 6 | 8 | 10 | | D | F | A | C | | | | | | | | | | | | | |
| EDOMINANT MAJOR SEVENTH | 5 | 7 | 9 | 11 | | E | G# | B | D | | | | | | | | | | | | | |
| FMAJOR SEVENTH | 6 | 8 | 10 | 12 | | F | A | C | E | | | | | | | | | | | | | |
| GDIMINISHED SEVENTH | 7 | 9 | 11 | 13 | | G# | B | D | F | | | | | | | | | | | | | |
| | | | | | | | | | | | | | | | | | | | | | | |
| | | | | | | | | | | | | | | | | | | | | | | |
| | | | | | | | | | | | | | | | | | | | | | | |

FIG. 3F

| SEQUENCE | USER ACTION | RESULT | COMMENT |
|---|---|---|---|
| 1 | + - | +SCROLLS NOTE -MUTES KEY<br>NEXT ENTERS NOTE +-EXITS | ENTER USER SCALE DEFINITION MODE |
| 2 | + | USER DEFINED 1 ENTRY?<br>C | |
| 3 | NEXT | USER DEFINED 1 ENTRY?<br>C C# | ACCEPT C, CALL UP C# |
| 4 | + | USER DEFINED 1 ENTRY?<br>C D | |
| 5 | NEXT | USER DEFINED 1 ENTRY?<br>C D D# | ACCEPT D, CALL UP D# |
| 6 | + | USER DEFINED 1 ENTRY?<br>C D E | |
| 7 | + | USER DEFINED 1 ENTRY?<br>C D F | |
| 8 | NEXT | USER DEFINED 1 ENTRY?<br>C D F F# | ACCEPT F, CALL UP F# |
| 9 | NEXT | USER DEFINED 1 ENTRY?<br>C D F F# G | ACCEPT F#, CALL UP G |
| 10 | + | USER DEFINED 1 ENTRY?<br>C D F F# G# | |
| 11 | NEXT | USER DEFINED 1 ENTRY?<br>C D F F# G# A | ACCEPT G#, CALL UP A |
| 12 | NEXT | USER DEFINED 1 ENTRY?<br>C D F F# G# A A# | ACCEPT A, CALL UP A# |
| 13 | + | USER DEFINED 1 ENTRY?<br>C D F F# G# A B | |
| 14 | + - | USER DEFINED 1<br>C D F F# G# A B | EXITING ACCEPTS B, SEARCHES FOR SCALE MATCH, SAVES SCALE IN USER DEFINED 1. |

FIG. 12A

| SEQUENCE | USER ACTION | RESULT | COMMENT |
|---|---|---|---|
| 1 | [+] [-] | +SCROLLS NOTE -MUTES KEY<br>NEXT ENTERS NOTE +-EXITS | ENTER USER SCALE DEFINITION MODE |
| 2 | [+] | USER DEFINED 1 ENTRY?<br>C | |
| 3 | [NEXT] | USER DEFINED 1 ENTRY?<br>C C# | ACCEPT C, CALL UP C# |
| 4 | [+] | USER DEFINED 1 ENTRY?<br>C D | |
| 5 | [NEXT] | USER DEFINED 1 ENTRY?<br>C D D# | ACCEPT D, CALL UP D# |
| 6 | [+] | USER DEFINED 1 ENTRY?<br>C D E | |
| 7 | [+] | USER DEFINED 1 ENTRY?<br>C D F | |
| 8 | [NEXT] | USER DEFINED 1 ENTRY?<br>C D F F# | ACCEPT F, CALL UP F# |
| 9 | [-] | USER DEFINED 1 ENTRY?<br>C D F X G | MUTE KEY 4, CALL UP G TO KEY 5 |
| 10 | [+] | USER DEFINED 1 ENTRY?<br>C D F X G# | |
| 11 | [NEXT] | USER DEFINED 1 ENTRY?<br>C D F X G# A | ACCEPT G#, CALL UP A |
| 12 | [NEXT] | USER DEFINED 1 ENTRY?<br>C D F X G# A A# | ACCEPT A, CALL UP A# |
| 13 | [+] | USER DEFINED 1 ENTRY?<br>C D F X G# A B | |
| 14 | [+] [-] | USER DEFINED 1<br>C D F X G# A B | EXITING ACCEPTS B, SEARCHES FOR SCALE MATCH, SAVES SCALE IN USER DEFINED 1. |

FIG. 12B

| SEQUENCE | USER ACTION | RESULT | COMMENT |
|---|---|---|---|
| 1 | + - | +SCROLLS NOTE -MUTES KEY<br>NEXT ENTERS NOTE +-EXITS | ENTER USER SCALE DEFINITION MODE |
| 2 | - | USER DEFINED 1 ENTRY?<br>B | |
| 3 | - | USER DEFINED 1 ENTRY?<br>A# | |
| 4 | - | USER DEFINED 1 ENTRY?<br>A | |
| 5 | NEXT | USER DEFINED 1 ENTRY?<br>A A# | ACCEPT A, CALL UP A# |
| 6 | + | USER DEFINED 1 ENTRY?<br>A B | |
| 7 | NEXT | USER DEFINED 1 ENTRY?<br>A B C | ACCEPT B, CALL UP C |
| 8 | + | USER DEFINED 1 ENTRY?<br>A B C# | |
| 9 | + | USER DEFINED 1 ENTRY?<br>A B D | |
| 10 | NEXT | USER DEFINED 1 ENTRY?<br>A B D D# | ACCEPT D, CALL UP D# |
| 11 | - | USER DEFINED 1 ENTRY?<br>A B D X E | MUTE KEY 4, CALL UP E TO KEY 5 |
| 12 | + | USER DEFINED 1 ENTRY?<br>A B D X F | |
| 13 | NEXT | USER DEFINED 1 ENTRY?<br>A B D X F F# | ACCEPT F, CALL UP F# |
| 14 | NEXT | USER DEFINED 1 ENTRY?<br>A B D X F F# G | ACCEPT F#, CALL UP G |
| 15 | + | USER DEFINED 1 ENTRY ?<br>A B D X F F# G# | |
| 15 | + - | USER DEFINED 1<br>A B D X F F#G# | EXITING ACCEPTS G#, SEARCHES FOR SCALE MATCH, SAVES SCALE IN USER DEFINED 1. |

FIG. 12C

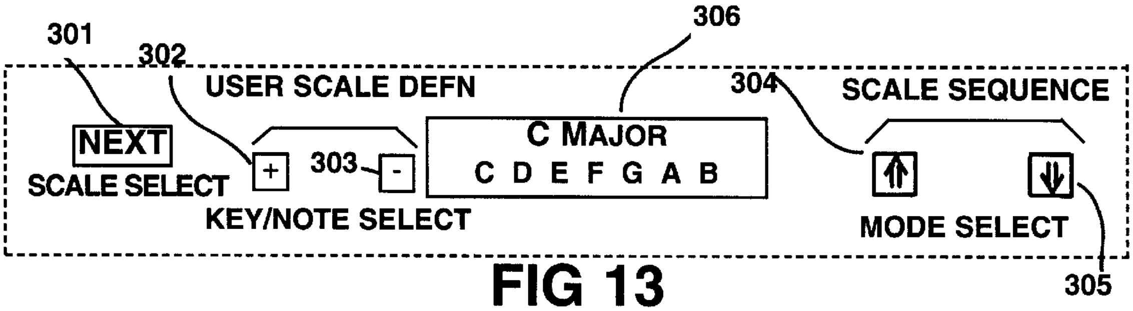

FIG 13

| SEQUENCE | USER ACTION | RESULT | COMMENT |
|---|---|---|---|
| 1 | ↑ ↓ | ↑ OR ↓ MODE.+OR-:KEY NEXT ACCEPTS. ↑↓ EXITS | |
| 2 | ↓ | C MAJOR (IONIAN) ? C D E F G A B | |
| 3 | NEXT | C DORIAN ? C Db Eb F G Ab Bb | C MAJOR IS ENTERED INTO BUFFER. Db MAJOR IS CALLED UP. |
| 4 | ↓ | C PHRYGAIN ? C Db Eb F G Ab Bb | |
| 5 | ↓ | C LYDIAN ? C D E F# G A B | |
| 6 | ↓ | C MIXOLYDIAN ? C D E F G A Bb | |
| 7 | ↓ | C MINOR (AEOLIAN) ? C D Eb F G Ab Bb | |
| 8 | - | B MINOR (AEOLIAN) ? B C# D E F# G A | |
| 9 | - | Bb MINOR (AEOLIAN) ? Bb C Db Eb F Gb Ab | |
| 10 | - | A MINOR (AEOLIAN) ? C D F X G# A A# | |
| 11 | NEXT | A LOCRIAN ? A Bb C D Eb F G | |
| 12 | ↑ | A MINOR (AEOLIAN) ? A B C D E F G | |
| 13 | + | Bb MINOR (AEOLIAN) ? Bb C Db Eb F Gb Ab | |

FIG. 14A

| SEQUENCE | USER ACTION | RESULT | COMMENT |
|---|---|---|---|
| 14 | + | B MINOR (AEOLIAN) ? <br> B C# D E F# G A | |
| 15 | + | C MINOR (AEOLIAN) ? <br> C D Eb F G Ab Bb | |
| 16 | ↑ | C MIXOLYDIAN ? <br> C D E F G A Bb | |
| 17 | ↑ | C LYDIAN ? <br> C D E F# G A B | |
| 18 | ↑ | C PHRYGIAN ? <br> C Db Eb F G Ab Bb | |
| 19 | ↑ | C DORIAN ? <br> C D Eb F G A Bb | |
| 20 | ↑ | C MAJOR (IONIAN) ? <br> C D E F G A B | |
| 21 | NEXT | C DORIAN ? <br> C D Eb F G A Bb | C MAJOR IS ENTERED INTO BUFFER. C DORIAN IS CALLED UP. |
| 22 | ↓ | C PHRYGIAN ? <br> C Db Eb F G Ab Bb | |
| 23 | ↓ | C LYDIAN ? <br> C D E F# G A B | |
| 24 | ↓ | C MIXOLYDIAN ? <br> C D E F G A Bb | |
| 25 | ↓ | C MINOR (AEOLIAN) ? <br> C D Eb F G Ab Bb | |
| 26 | ↓ | C LOCRIAN ? <br> C Db Eb F Gb Ab Bb | |
| 27 | ↓ | C HARMONIC MINOR ? <br> C D Eb F G Ab B | |
| 28 | ↓ | C MELODIC MINOR ? <br> C D Eb F G A B | |

FIG. 14B

| SEQUENCE | USER ACTION | RESULT | COMMENT |
|---|---|---|---|
| 29 | ↓ | C ENIGMATIC ?<br>C Db E F# G# A# B | |
| 30 | ↓ | C NEAPOLITAN MAJOR ?<br>C Db Eb F G A B | |
| 31 | ↓ | C NEAPOLITAN MINOR ?<br>C Db Eb F G Ab B | |
| 32 | ↓ | C HUNGARIAN MINOR ?<br>C D Eb F# G Ab B | |
| 33 | ↓ | C OVERTONE ?<br>C D E F# G A Bb | |
| 34 | ↑ | C LYDIAN MINOR ?<br>C D E F# G Ab B | |
| 35 | ↑ | C LYDIAN AUGMENTED ?<br>C D E F# G# A B | |
| 36 | ↓ | C DOUBLE HARMONIC ?<br>C Db E F G Ab B | |
| 37 | ↓ | C INDIAN ?<br>C D E F G Ab Bb | |
| 38 | ↓ | C ORIENTAL ?<br>C Db E F Gb A Bb | |
| 39 | ↓ | C SUPER LOCRIAN ?<br>C Db Eb E Gb Ab Bb | |
| 40 | ↓ | C ALTERED ?<br>C Db Eb E F Ab Bb | |
| 41 | ↓ | C WHOLE TONE (AUG) ?<br>C D E F# G# A# X | |
| 42 | ↓ | C MINOR 2 + MINOR 3 ?<br>C Db E F G# A B | |
| 43 | ↓ | C BLUES (PENT M+3RD) ?<br>C Eb E F G X Bb | |
| 44 | ↓ | C PENTATONIC MAJOR ?<br>C D E X G A X | |
| 45 | ↓ | C PENTATONIC MINOR ?<br>C X Eb F G X Bb | |
| 46 | ↑ ↓ | C PENTATONIC MINOR ?<br>C X Eb F G X Bb | C PENTATONIC MINOR IS ENTERED. EXIT SCALE SEQUENCE ENTRY MODE. RETURN TO NORMAL OPERATION. |

FIG. 14C

SIMPLIFIED KEYBOARD AND ELECTRONIC MUSICAL INSTRUMENT

BACKGROUND OF THE INVENTION

1. Technical Field

The present invention relates to musical instruments, specifically to an electronic keyboard designed to greatly simplify the playing of chord and note patterns.

2. Background

Almost all keyboard-based musical instruments have followed one paradigm: fashioning the keyboard around the chromatic scale, i.e., a scale composed of twelve semi-tones. This holds true for pianos, organs and all such devices. With the advent of the electronic keyboard, several inventors have added the ability to play entire chords with the touch of a single key. This addition permitted less skilled players to play what would otherwise be a complex pattern of three or more keys and which required much practice. One skilled in the art will appreciate that the development of chord playing skills in all of the various key signatures and modes typically requires many years to master. Many prospective keyboardists give up before achieving this skill level.

The one key approach imposes many limitations. The individual notes of the chord are not accessible, therefore arpeggios are not possible. This same limitation is revealed when syncopated playing of the notes within the chord group is desired. A dynamic performance cannot be accommodated when, for example, other musicians accompany the keyboardist and a change in tempo is desired.

Inventions such as the apparatus of U.S. Pat. No. 4,389,914 issued Jun. 28, 1983 to inventors Dale M. Uetrecht et al. provided for ways to identify a chord played on a keyboard and for identifying the root note. This feature permitted the enhancement of the playing of a single line melody by adding chord accompaniment. It also allowed the normal playing of a plurality of notes, and having determined the root of the chord, voiced additional notes related to the chord group. This feature, while effectively filling in extra notes for a richer sound, did not provide the needed flexibility for the musician to control the notes being played, neither in loudness nor tempo.

Present chord-playing technology available lacks the means to introduce the human element into the playing, such as key velocity, tempo, sustain, deletion of selected notes, addition of selected notes, etc. Rhythm patterns cannot be dynamically changed. The main reason for all of the aforementioned limitations is that the previous inventions attempt to maintain backwards-compatibility with the traditional piano keyboard. Computer assistance has therefore been limited to the playing of a single key to sound a chord group.

With the invention of the Hotz MIDI (Musical Instrument Digital Interface) Translator, U.S. Pat. No. 5,099,738, a technology was introduced which allowed human choice in selectively playing one or more notes within a chord grouping without the possibility of playing a wrong note. This helps the unskilled player but does not provide the flexibility needed by musicians in a performance. The invention requires that a computer menu be accessed by a mouse pointing device, a specific chord such as F# (sharp) minor be selected, and that it then be assigned to the appropriate zone on the keyboard device. The computer program assigns the contents of a look-up table for the chord to the keys on the keyboard. This assignment cannot be changed in the performance environment, hence the performer is limited to the selections previously made. Neither the interval, octave, scale nor notes can be altered during the live performance.

A recent novel invention sought to overcome all of the above limitations in the Dynamic Chord Interval and Quality Modification Keyboard, Chord Board CX10, U.S. Pat. No. 5,440,071 invented by Grant Johnson, issued Aug. 8, 1995. This invention dramatically alters the appearance of the traditional keyboard. Instead of the traditional pattern of seven white keys and five black keys repeated several times to form a contiguous set of keys, the Chord Board arranges keys in eight groups. Within those eight groups are two subgroups: bass and treble keys. The preferred embodiment consists of three bass keys and five treble keys in each of the eight sub-groups. A key signature button selects a key signature (e.g. C, C#, D, D#, etc.) which is applied to the whole keyboard. For each group, a chord type may be independently selected, although the chord root note is set by means of the key signature selection. On the surface, this invention appears to greatly simplify the playing of chords common to the selected key signature. This is not done without sacrificing other important considerations. The dynamic playing of some chords requires two hands to play the notes traditionally accessible by one hand. For example, if the Chord Board is set to play in the key signature of C and both an F major and F7 chord are desired at differing times in the composition, the chord type for the group governing the F chords must be altered during the performance. The most glaring limitation is that the individual notes of the scale, i.e. key of C in this example, is extremely difficult. The musician would have to move his/her right hand selectively through the root notes of all eight banks in order to play a simple scale in the key of C. Making matters even more difficult, the root notes are not in an easy or obvious pattern. For example, in the key of C, the following sequence would have to be played to sound the eight notes in the key of C in ascending order: bottom left, top left, second-from-the-top right, third-from-the-top left, second-from-the-top left, top right, bottom right, third-from-the-top right. Thus, while simplifying the playing of chords, the inventor has severely complicated the playing of the notes of a scale.

No significant assistance has been provided to simultaneously reduce the skill level required to play the notes within a scale and simultaneously reduce the skill level required to play chords.

DISCLOSURE OF INVENTION

It is therefore the object of the present invention to provide an electronic musical instrument with a novel keyboard which provides a number of advantages:

a. Dramatically reducing the time required to learn to play music:

A typical student studying piano within a traditional conservatory training program spends an inordinate amount of his/her time memorizing and practicing scales and modal variations of those scales. The demands of the chromatic keyboard require a great deal of dedication and desire to keep motivated in this memorization. The present invention allows the musician to select the scale (i.e. root note/key signature and mode) and automatically programs the keys of the keyboard to the notes of the selected scale and mutes excess notes and keys. This means that no key on the keyboard may cause a note to be sounded unless it is a valid note within the currently selected mode and scale. No scale memorization is required, thereby saving all of the tedious repetition required in the conventional keyboard. Because every key on the keyboard represents a valid note, the playing of notes outside of the selected scale by accident is eliminated.

b. Elimination of chord pattern memorization:

With the traditional keyboard, once the scales are known, more time is spent learning the chord patterns which may be used within the scale. Valid patterns of keys must be learned for each key signature and mode on the traditional keyboard. Many thousands of valid chord patterns must potentially be memorized. Most accomplished keyboardists never thoroughly learn more than a small portion of all the possible combinations. The present invention requires that the keyboardist learn only one set of chord patterns. These same patterns can be applied in any selected scale thus almost eliminating the learning task. Not only are the number of patterns to be remembered fewer, the patterns themselves are dramatically simpler. For example, with the seven keyboard keys per octave of the present invention (i.e. up to seven useable notes within an octave, up to eight including the note one octave above the root), the root or base chord for the selected scale is always comprised of keyboard key numbers 1, 3 and 5. In the preferred embodiment of the present invention, this corresponds to three adjacent white keys, i.e. every other key beginning with the root note. The most heavily used chord types all have similar, very simple patterns. Not only are the patterns to be learned reduced in number, they are also reduced in complexity. The underlying concept of the present invention is the presence of a repeating recognizable group of seven keyboard keys and is not limited to the described pattern of white-black-w-b-w-b-w-b-w. For example, the keys may all be the same color, but alternate in shape, or the keys may all be the same shape but have seven different colors. A myriad set of combinations and permutations exist that may be used to implement this fundamental concept.

c. Reduction of the required physical reach of a musician:

Another objective is to permit individuals with small hands or limited flexibility to reach more desired notes. For example, a common tonal combination is the first, fifth and tenth notes in a scale. This requires a reach encompassing seventeen keys on the traditional keyboard. The present invention, using seven keyboard keys per octave, reduces the physical reach to encompass only ten keys, putting this type of sequence into the reach of any child or adult without altering the size of the individual keyboard key.

d. Reduction in the size of a keyboard without loss of range:

The physical size of a full keyboard is large. For example, a full-size piano keyboard has 88 keys. A musician who desires that full range of keys immediately accessible without having to press switches or levers, etc., must have enough space to accommodate the large physical size. Making the keys narrower is not a universally acceptable solution because the keys become too close to actuate without erroneously hitting an adjacent key. The present invention eliminates five out of every twelve keys on the traditional keyboard without limiting the range of octaves immediately accessible. This represents a reduction in the number of keyboard keys of 41%, and corresponds to a physical size reduction of the keyboard without altering the size of the keys.

e. Ease in learning unfamiliar music:

It is extremely difficult in most regions to learn the music of a culture unfamiliar to the experience of the music teachers available to the student. Materials and instruction may not be readily available and scale patterns will most likely be unusual and complex. With the present invention, the student need only find out the intervals of the notes within the desired scale of the unfamiliar music style. The intervals can be programmed as a user defined scale using the User Scale Definition interface means of the present invention. With this provision, the same chord patterns already learned on the present invention can be applied to this previously unknown set of note intervals.

f. Assistance in selecting key signature and mode:

A keyboardist with very little skill will not be well acquainted with music theory and therefor would need assistance in determining which mode, and perhaps which key signature, is the correct choice for a musical composition. The present invention provides assistance in selecting the most desirable key signature and mode for the musical composition by the User Scale Definition means.

To achieve the above objectives, an electronic musical instrument, in accordance with the preferred embodiment of the present invention, has a keyboard layout as shown in FIG. 1. The vast majority of all useful music scales are comprised of five, six or seven semitones. In fact, the scales containing fewer than seven semitones are a subset of a seven semitone scale. The present invention, therefor, is comprised of a recognizable repeating pattern of seven keys which, when adding a plurality of groups of these seven keys side by side, form the new keyboard layout. As previously stated, a myriad implementations may also be chosen to implement the same concept, however the preferred embodiment is selected as illustrated to minimize overall keyboard size, maximize pattern recognition, and maintain the most possible commonality with the traditional chromatic keyboard. The console operator means of FIG. 4 (301–303, 305–306) permit the musician to select one of many preprogrammed key signatures and modes, i.e. many different musical scales. By key signature is meant the root note assignment, e.g. if the key signature of C is selected and the MAJOR mode is selected, referring to FIG. 2, within device 100, 1 has the musical value C, 2 has the value D, 3 has the value E, 4 has the value F, 5 has the value G, 6 has the value A, 7 has the value B, 8 has the value C (but one octave higher than 1), 9 has the value D (but one octave higher than 2, etc. By mode is meant major, minor, harmonic minor, melodic minor, phrygian, dorian, etc.

The value of such a keyboard layout quickly becomes obvious to those acquainted with music theory. Whereas the traditional keyboarded musical instrument requires that the student learn twelve different scale patterns for the major key signatures alone, the present invention requires that the student learn only one pattern: the pattern is, referring to FIG. 2, keys 1, 2, 3, 4, 5, 6, 7, 8 to play, in ascending order, the notes of one seven-note scale. That same pattern applies to any key signature. That same pattern also applies regardless of the mode (provided that the mode creates a scale with seven notes), of which there are numerous modal variations. Scales which have fewer than seven notes, such as the various Pentatonic scales and their modes which each have five notes, require a sequence dependent upon the scale composition. For example, a Pentatonic Major scale is a Major scale with deleted fourth and seventh notes. This is most easily mapped to the present invention by muting keys 4 and 7 in FIG. 2, thus making the scale 1, 2, 3, 5, 6, 8. Keys that are muted are displayed (304) as an "X" rather than a musical note as an aid to the user. Most other Pentatonic scales are variants of seven-note scales which drop the second and sixth notes, thus the scale sequence formed by keys 1, 3, 4, 5, 7, 8 allow the user to retain maximum use of the chord patterns learned for the seven-note scale. Keys 2 and 6 in this example are muted. Alternatively, selecting a Major scale and ignoring keys 4 and 7 would achieve the same result as selecting a Pentatonic Major scale but would defeat a feature of the present invention, namely the elimination of unwanted notes. The same principle applies to six-note scales such as the blues scale, also known as Pentatonic minor with added third. In this case, key 6 is muted, allowing maximum use of the chord patterns learned for the seven-note scale. Thus, instead of having to memorize how to traverse the traditional keyboard in each of the hundreds of different possible scale patterns, the student need learn only one pattern of the utmost simplicity and the present invention will prevent the sounding of notes outside of the selected scale.

The value of the present invention is also seen in the simplicity of the patterns which must be learned in order to play chords. Rather than attempting to simplify chords by using electronically determined note fills or one-touch-key chords, etc. as done in prior art, the present invention results in a single set of simple patterns which must be learned. These patterns apply to the various root note and mode combinations without modification. Using the key of C and Major mode (i.e. C Major scale) for example, the essential chords are C Major, D Minor, E Minor, F Major, G Major, A Minor, B Diminished, C Major Seventh, D Minor Seventh, E Minor Seventh, F Major Seventh, G Dominant Major Seventh, A Minor Seventh, B Half Diminished Flat Seventh. FIG. 3*a* illustrates which keys of FIG. 2 on keyboard 100 comprise these chords. As can be seen when using the patterns of FIG. 3*a* on keyboard 100, the patterns are extremely simple. The I chord (in this case C major) is comprised of keys 1, 3 and 5, the first three white keys starting with the root note. The root note is identified as the white key immediately to the left of the triad of alternating black keys. The II chord (D Minor) is comprised of keys 2, 4 and 6, or the first three black keys. The III chord (E Minor) is comprised of keys 3, 5 and 7, i.e. three adjacent white keys played shifted right by one as compared to C Major, and once again, is every other key. The IV chord (F Major) is comprised of keys 4, 6 and 8, i.e. starting with the middle black key of the triad and every other keyboard key for the next two notes. The other chords continue in similar, easy to remember patterns, namely, every other keyboard key starting with a particular starting key. Similarly, the sevenths group of aforementioned chords follows easy patterns: C Major Seventh is comprised of keys 1, 3, 5 and 7, which is once again every other key beginning with key 1, in this case being all white keys, but unlike the major chords, one extra key is added to the sequence. D Minor Seventh is comprised of keys 2, 4, 6 and 8, i.e. every other key beginning with key 2. The other chords among the sevenths continues in similar, easy to remember patterns. There are, of course, a myriad other chord types but they too have very simple patterns, and only one pattern per chord type. Examples of chord types include Major, Minor, Augmented, Diminished, Major Ninth, Minor Ninth, suspended fourth, etc., as known in the art.

Changing to a different mode, for example from major to harmonic minor, does not alter the patterns learned. The basic chords in C Minor, as shown in FIG. 3*e*, range from C Minor to B Diminished and follow the same patterns: 1, 3, 5, then 2, 4, 6, then 3, 5, 7, then 4, 6, 8, etc. just like in the C Major scale. Without learning a whole new set of patterns for each scale, the musician can play chords in any scale. FIGS. 3*a* through 3*f* demonstrate that this concept holds true for various key signature and mode combinations.

It can be readily seen that the present invention satisfies the need for reducing the staggering time necessary to become proficient with the keyboarded musical instrument in all the various key signatures and modes while not denying the musician the freedom to alter the chords or note patterns played during a performance.

Although the above description permits full musical control by the musician of any note combination within the select scale, there is occasionally a need for further human expression. For example, when the keyboard is used to emulate the voice of a guitar, it is occasionally necessary to simulate the bending of a guitar string, that is to say, to vary the note pitch between two values. Prior art keyboards satisfy this need by several means, the most popular being a pitch bend wheel. The pitch bend wheel, therefor, is a useful addition to the present invention to further enhance the human expression capability of the present invention. The act of pitch bending does in fact cause the sounding of tones not contained in a selected scale but that is acceptable because it is under the deliberate artistic control of the user and does not defeat any of the objectives of the present invention, specifically, preventing the accidental sounding of a tone outside of the selected scale.

It is also advantageous to provide the option to the musician of the presence of foot pedals to assist with various keyboard functions. Such functions include:

a. Bass pedals incorporating the same simple layout pattern of FIG. 2. This allows the musician to play richer sounding music but without incurring as difficult a burden to learn to play foot pedals as with the traditional arrangement. It also permits the musician to simultaneously control one channel of additional independent voice(s).

b. Any of the five sensing devices of FIG. 4 (301–303, 305–306) can be made available as foot activated devices, especially 301. This keeps the hands of the musician free to operate the keyboard keys and yet scale alterations can still be made.

c. Any of the other sensing devices of FIG. 4 (309–310) can be made available as foot activated devices. This permits foot-operated volume control and access to other control functions without removing a hand from the keyboard keys.

d. Variable foot pedals such as Damper, Sostenuto or Soft, all known in the art, can be added for finer note sound control.

A means for entering user-defined scales is provided to permit access to scales which may be less popular, yet to be conceived, or which may not be known to musicians in the mainstream culture. The means can be provided in many ways. The preferred embodiment of data entry and scale selection, shown in FIG. 4, consists of five sensing devices (such as switches) and a display device (such as a liquid crystal display or LCD) although many alternative embodiments can be employed. Operation of this portion of the present invention will be discussed later.

BRIEF DESCRIPTION OF THE DRAWINGS

FIG. 3*a* is a table showing the note intervals of the C Major scale, how the notes map to the keyboard of FIG. 1, and how the primary chords utilized in the C Major scale map to which keys of the keyboard key layout of FIG. 2;

FIG. 3*b* is a table showing the note intervals of the C Mixolydian scale, how the notes map to the keyboard of FIG. 2, and how the primary chords utilized in the C Mixolydian scale map to which keys of the keyboard key layout of FIG. 2;

FIG. 3*c* is a table showing the note intervals of the C Dorian scale, how the notes map to the keyboard of FIG. 2, and how the primary chords utilized in the C Dorian scale map to which keys of the keyboard key layout of FIG. 2;

FIG. 3*d* is a table showing the note intervals of the C Phyrgian scale, how the notes map to the keyboard of FIG. 2, and how the primary chords utilized in the C Phrygian scale map to which keys of the keyboard key layout of FIG. 2;

FIG. 3*e* is a table showing the note intervals of the C Harmonic minor scale, how the notes map to the keyboard of FIG. 2, and how the primary chords utilized in the C Harmonic minor scale map to which keys of the keyboard key layout of FIG. 2;

FIG. 3*f* is a table showing the note intervals of the A Harmonic minor scale, how the notes map to the keyboard key layout of FIG. 2, and how the primary chords utilized in the A Harmonic minor scale map to which keys of the keyboard key layout of FIG. 2;

FIG. 12*a* is a first example of how scales are defined, using the selections of FIG. 11;

FIG. 12*b* is a second example of how scales are defined, using the selections of FIG. 11;

FIG. 12*c* is a third example of how scales are defined, using the selections of FIG. 11;

FIG. 13 is a diagram illustrating the preferred embodiment of the means to store scales in a memory buffer for later recall;

FIG. 14*a* is a listing of user actions to store scales, using the selections of FIG. 13;

FIG. 14*b* is a listing of user actions to store scales, using the selections of FIG. 13, continued from FIG. 14*a;*

FIG. 14*c* is a listing of user actions to store scales, using the selections of FIG. 13, continued from FIG. 14*b;*

BEST MODE FOR CARRYING OUT INVENTION

Three embodiments of an electronic musical instrument in accordance with the present invention will be described: a minimum configuration embodiment (MCE) which is a musical instrument digital interface (MIDI) keyboard with no internal sound module or MIDI sequencer. Another embodiment, a rich configuration embodiment (RCE)—a MIDI keyboard capable of stand-alone operation, including internal sound module and MIDI sequencer, will be described later in much less detail. A third embodiment, a base pedal embodiment (BPE), constituting bass pedals will be described also in much less detail for the main purpose of indicating that the concept of the present invention can be applied to more than just a finger-operated keyboard. The concept behind the present invention is not limited to MIDI-interfaced keyboards, however, MIDI is currently the widely accepted standard keyboard interface and the most logical existing choice for an implementation of the present invention. Any references to MIDI should not be construed as a limitation upon the present invention. Any interface which satisfies the intent of MIDI can be substituted.

1. MINIMUM CONFIGURATION EMBODIMENT

Figure 4:
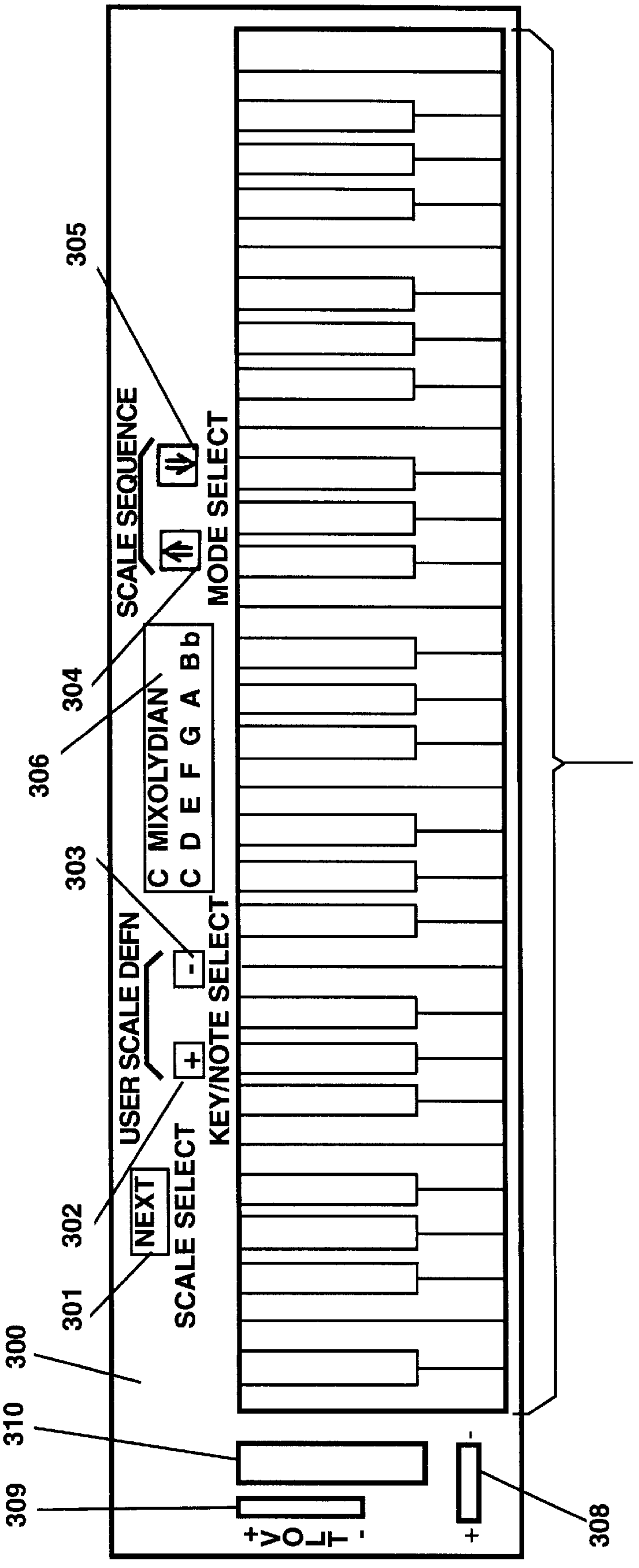
FIG. 4 is a diagram illustrating the preferred embodiment of a minimum configuration keyboard of the present invention.
Figure 15:
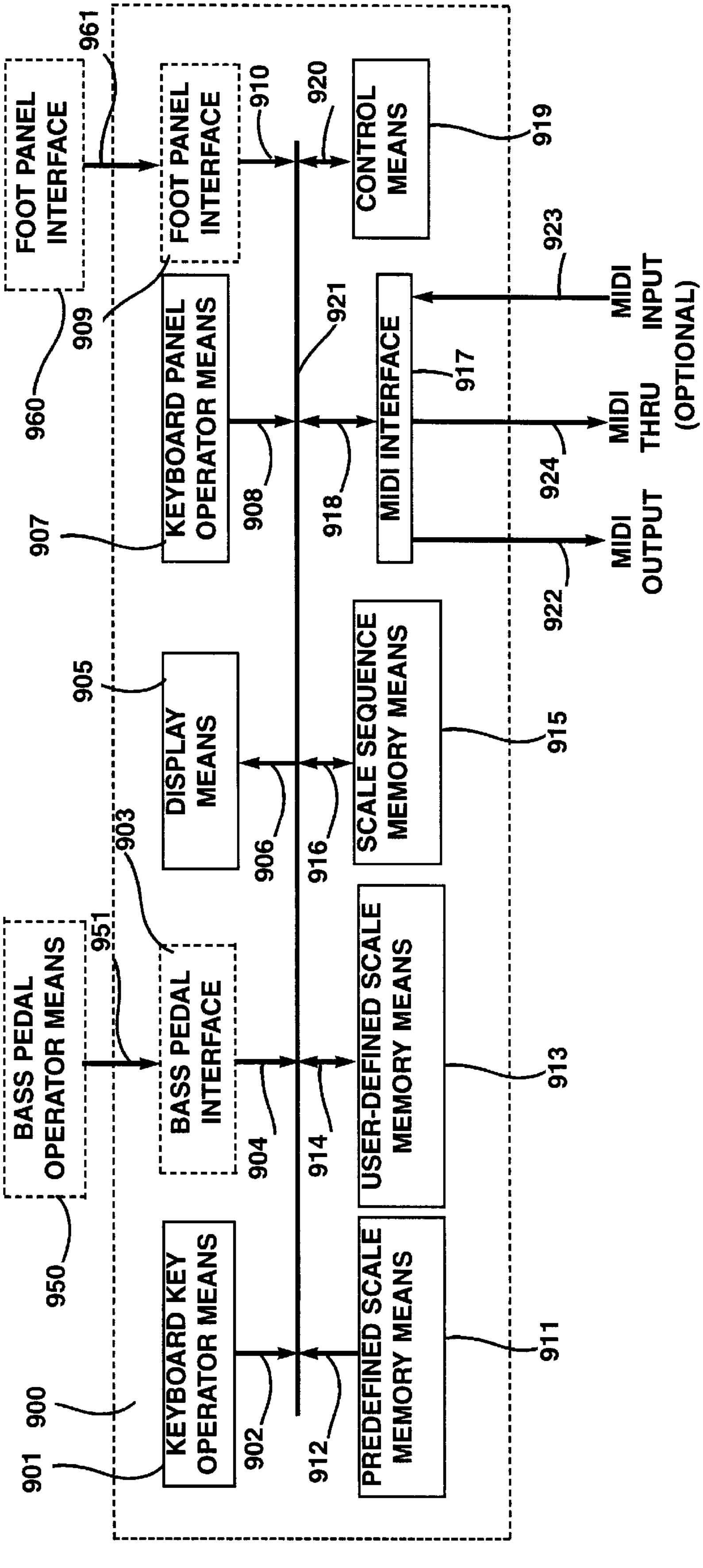
FIG. 15 is a block diagram defining the minimum configuration keyboard preferred embodiment of the present invention.

The minimum configuration embodiment (MCE) is illustrated in FIG. 4. A block diagram of the minimum configuration embodiment is shown in FIG. 15. The following table shall serve as a cross-reference between the drawing items of FIGS. 4 and 15. The following description of the MCE references FIGS. 4 and 15.

| FIG. 4 Item(s) | FIG.15 Item(s) | Comment |
|---|---|---|
| 300 | 900 | Min Configuration Keyboard |
| 301–305, 308–310 | 907 | User Control Operators |
| 306 | 905 | Display |
| 307 | 901 less interface portion of the operator | Keyboard key operators, interface is inherent in 901, not shown in 307 |

The primary internal functional units are described as follows.

Keyboard key operator 901 is comprised of a plurality of keyboard keys arranged in the order shown in FIG. 2 and again shown in FIG. 4 item 307, a means for detecting that a key is actuated, and optionally a means for detecting how hard and/or how quickly a key is actuated or released (known in the art as pressure sensing or after-touch, and velocity sensing). Information is transmitted by output interface 902 to the other internal functional units.

Bass pedal interface 903 contains input circuitry which accepts pedal actuation information from bass pedal operator 950 via output 951. Pedal actuation information consists of data representing which pedals are being activated, and optionally how hard and/or how quickly a pedal is actuated or released. Output interface 904 contains output circuitry which provides the pedal actuation information to the other internal functional units.

Display 905 consists of a multiple-character, multiple-line display device. The preferred embodiment is a 2 line×24 character liquid crystal display (LCD), although this should not be construed as a limit placed upon the MCE. The display receives the information to be displayed using input interface 906.

Keyboard panel operator 907 is comprised of the remaining user interface devices of the MCE. This consists of an input sensor 301 for the purpose of implementing the "NEXT" user input, an input sensor 302 for the purpose of implementing the "+" user input, an input sensor 303 for the purpose of implementing the "−" user input, an input sensor 304 for the purpose of implementing the "↑" user input, an input sensor 305 for the purpose of implementing the "↓" user input. Input sensors 301–305 are preferably momentary contact switches although this should not be construed as a limit placed upon the MCE. Additionally, keyboard panel operator 907 also consists of an input sensor 308 for the purpose of implementing the pitch bend user input, input sensor 309 for the purpose of implementing the volume control user input, and a plurality of input sensors 310 for the purpose of implementing other miscellaneous functions such as turning the power on/off and options such as allowing MIDI channel assignments to various sections of the keyboard and bass pedals, sensitivity adjustments of the pitch bend sensor, sensitivity adjustments of the keyboard keys, sensitivity adjustments of the bass pedals, etc.

Foot panel interface 909 contains input circuitry which accepts data from the foot panel operator 960 by way of output 961. Foot panel information consists of data representing such information as, but not limited to, scale selection, key/note selection, mode selection, volume, sustain, breath, etc. Output interface 910 provides foot panel information to the other functional units.

Predefined scale memory 911 contains data on each predefined scale type including the number of notes, the note intervals and a collective name for the plurality of notes of the scale. It is preferable that predefined scale memory 911 be implemented using some manner of alterable non-volatile memory such as, but not limited to, FLASH EPROM (erasable programmable read-only memory) or EEPROM (electrically programmable read-only memory) or battery-backed SRAM (static random access memory) to allow upgrades to the stored information although non-alterable memory such as ROM will satisfy the essential storage requirement of non-volatile storage. Output interface 912 provides predefined scale memory data to the other functional units. If an alterable non-volatile memory device is utilized for 911, interface 912 would be bi-directional instead of an output interface only.

User-defined scale memory 913 stores/recalls data on each user-defined scale type including the number of notes, the note intervals and a collective name for the plurality of notes of the scale. It is preferable that user-defined scale memory 913 be implemented using some manner of alterable non-volatile memory (such as, but not limited to, FLASH EPROM or EEPROM or battery-backed SRAM) to allow persistence of stored information although volatile memory such as non-battery backed SRAM or DRAM (dynamic random access memory) will satisfy the essential storage requirement. Output interface 914 provides a way to send/receive data to/from the user-defined scale memory. Predefined scale memory and user-defined scale memory could be combined into one component, EEPROM for example, to reduce the number of components in the implementation. Such a combining still permits both functions to exist.

Scale sequence memory 915 stores/recalls sufficient information as to uniquely define an order of scales to be selected from memory items 911 and 913. It is preferable that user-defined scale memory 915 be implemented using some manner of alterable non-volatile memory (such as, but not limited to, FLASH EPROM or EEPROM or battery-backed SRAM) to allow persistence of stored information although volatile memory such as non-battery backed SRAM or DRAM will satisfy the essential storage requirement. The scale sequence memory is used as a circular buffer by the control 919. For example, if the user wishes to rotate through a sequence of seven different scales at various points in playing the keyboard, seven scales are present in 915. A scale sequence pointer in control 919 contains a memory address which is used to locate information for the current scale. When the user inputs the "NEXT" command (item 907, specifically item 301), the pointer is advanced to the next scale in 915. Had that "NEXT" command caused the eighth scale to be referenced, instead the pointer is set to the first scale in this example. That is, the pointer wraps around in a circular manner through the valid scale sequence entries. Output interface 916 provides a way to send/receive data to/from the scale sequence memory. Scale sequence memory 915 could be combined with memory 911 and memory 913 in an appropriate electrical component such as EEPROM to reduce the number of components in the implementation. Such a combining still permits the three functions to exist.

MIDI interface 917 provides the interface which allows the MCE to transmit (and optionally receive and pass through) MIDI information to other MIDI devices. MIDI interface 917 provides data to and receives data from the other functional units by way of the bi-directional interface 918. MIDI output 922 is essential whereas MIDI input 923 is optional. MIDI input 923 permits other MIDI devices such as a sequencer to setup parameters in the MCE which may include scale sequence information, user-defined scale information, predefined scale information, key sensitivity information, etc. The MCE user interface programs scales in the form of a sequence of notes. A sequence of notes can therefor be input to the MCE using MIDI input 923 if desired as an option. The MIDI through output 924 is possible only if MIDI input 923 is present. The purpose of The MIDI through output 924 is to provide a quick MIDI loopback through the device for control of multiple MIDI slave devices from a single MIDI master device.

Control 919 provides all logic necessary to permit the orderly communication and control of all the above functional units. The control is preferably a microcontroller although the function can be accomplished with a wide variety of alternatives such as, but not limited to, a microprocessor, ASIC (application-specific integrated circuit), personal computer, discrete logic, etc. Bi-directional interface 920 provides the means for control 919 to interact with the other functional units.

Internal communications bus 921 is the means for internal communications between the functional units.

The internal functional units are connected as follows. Keyboard key operator 901 provides key actuation information using output 902 to an internal communications bus 921. The information is received from bus 921 by control 919 through an input/output interface 920. Control 919 constantly keeps track of which scale is currently selected. Display 905 receives information to be displayed on input interface 906. Input interface 906 is connected to bus 921. The display 905 displays information to the user to facilitate a user-friendly method for selecting predefined scales, user-defined scales and scale sequences, and to define the user-defined scales and scale sequences. Keyboard panel operator 907 consists of all panel operator devices shown in FIG. 4 (301–305, 308–310), i.e. input devices. Operator 907 provides information using output interface 908. Output interface 908 is connected to bus 921. An optional external device, bass pedal operator 950, sends information by the output interface 951 to a bass pedal interface 903. The bass pedal interface 903 sends information by output interface 904 to bus 921. Another optional external device, foot panel operator 960 sends information using output interface 961 to the foot panel interface 909. Foot panel interface 909 sends information using output interface 910 to bus 921. MIDI Interface 917 sends and receives information to/from bus 921 using input/output interface 918. MIDI interface 917 communicates with external MIDI devices using MIDI output interface 922, optional MIDI input interface 923 and optional MIDI through interface (i.e. output interface) 924. Predefined scale memory 911 sends scale information to bus 921 using output interface 912. User-defined scale memory 913 sends and receives information to/from bus 921 using input/output interface 914. Scale sequence memory 915 sends and receives information to/from bus 921 using input/output interface 916.

The manner in which the user of the present invention interfaces with the minimum configuration embodiment, and in which the internal functional units interact is described as follows:

1. When the MCE is turned on (using item 310), the control 919 reads scale sequence information from memory 915 (if memory 915 is non-volatile, otherwise default information is used) and reads note data from memory 911 if the first scale in memory 915 is a predefined scale or reads note data from memory 913 if the first scale in memory 915 is a user-defined scale. By first scale stored in memory 915 is meant the scale indicated by the aforementioned scale sequence pointer. Thus, the scale used when the unit was last powered on is the default scale when the unit is next turned on, or a default scale if no such information is found. The display 306 of FIG. 4 and 905 of FIG. 15 shows the root note of the selected scale, the mode (e.g. Major, Minor, etc.) and the notes contained in the scale (e.g. C, D, E, etc.).

Figure 1:
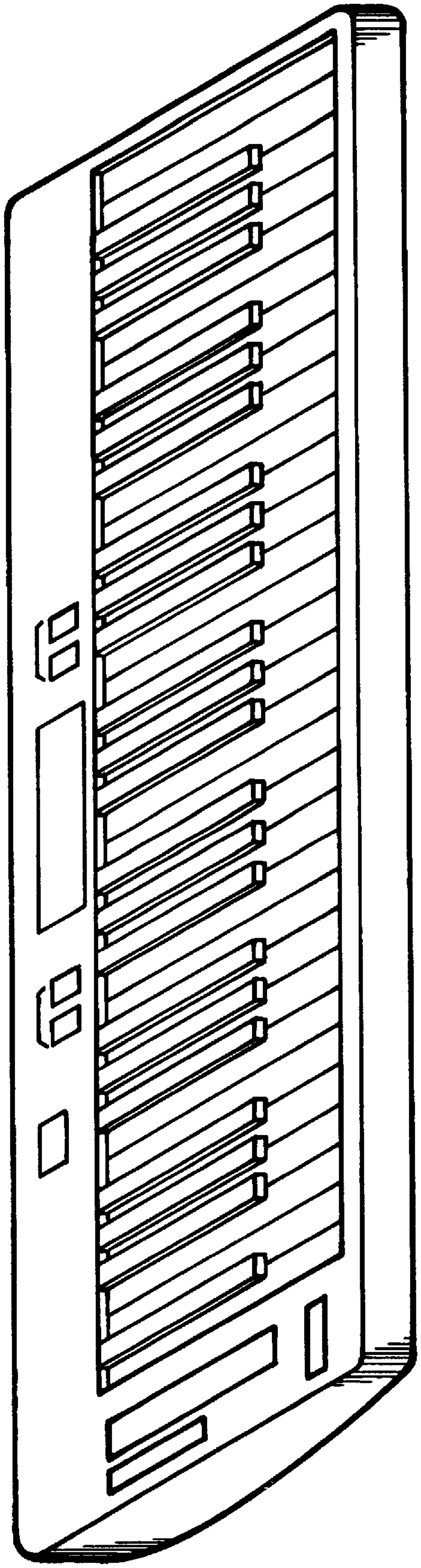
FIG. 1 is a perspective drawing of the electronic musical instrument keyboard.
Figure 2:
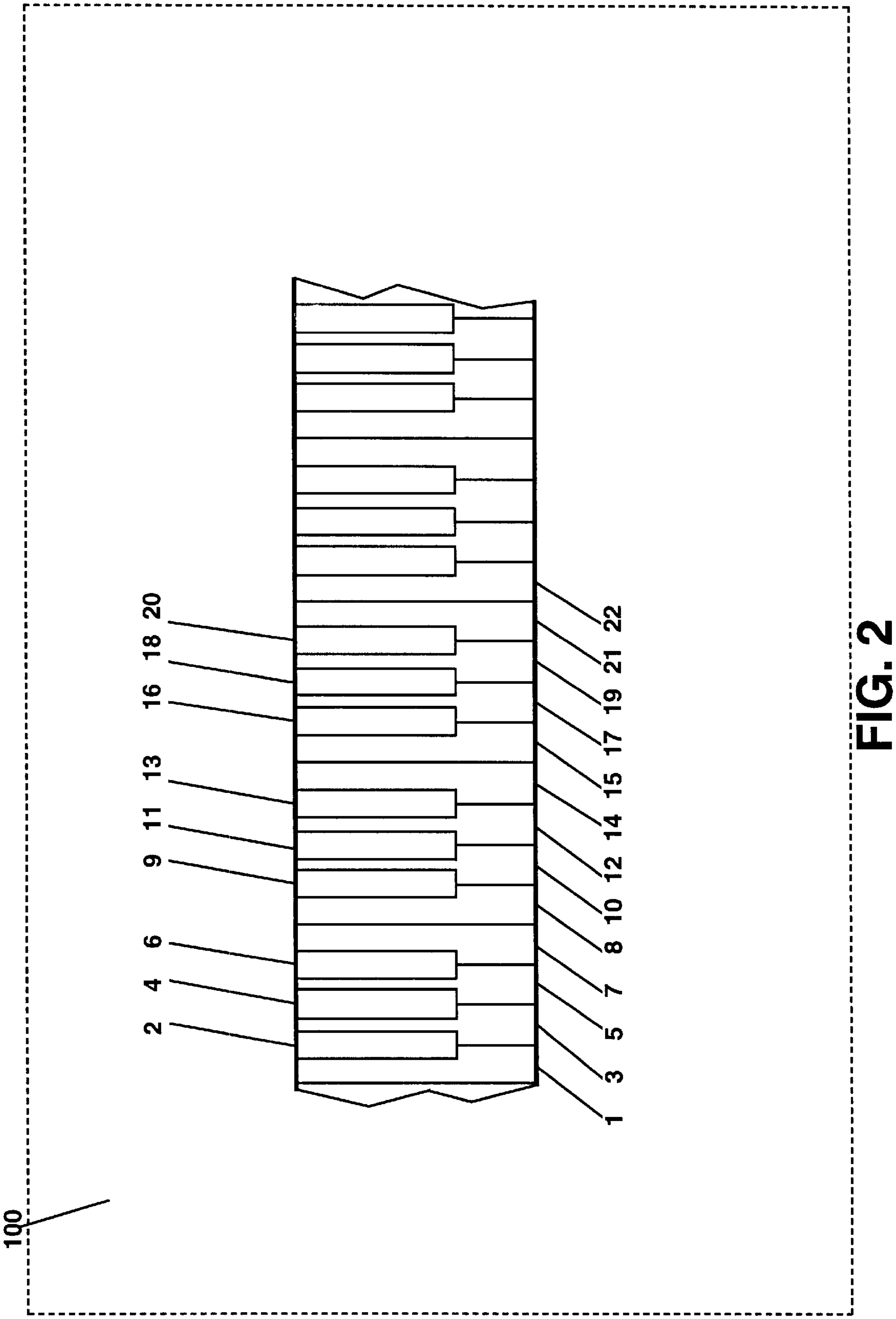
FIG. 2 is a diagram illustrating the preferred embodiment of the electronic musical instrument keyboard key layout of the present invention.
Figure 5:
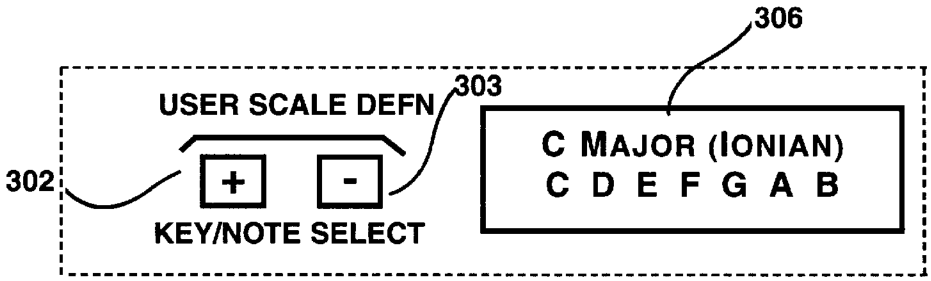
FIG. 5 is a diagram illustrating the preferred embodiment of the means to select the key signature (i.e. root note of the desired scale) of the present invention.
Figure 6:
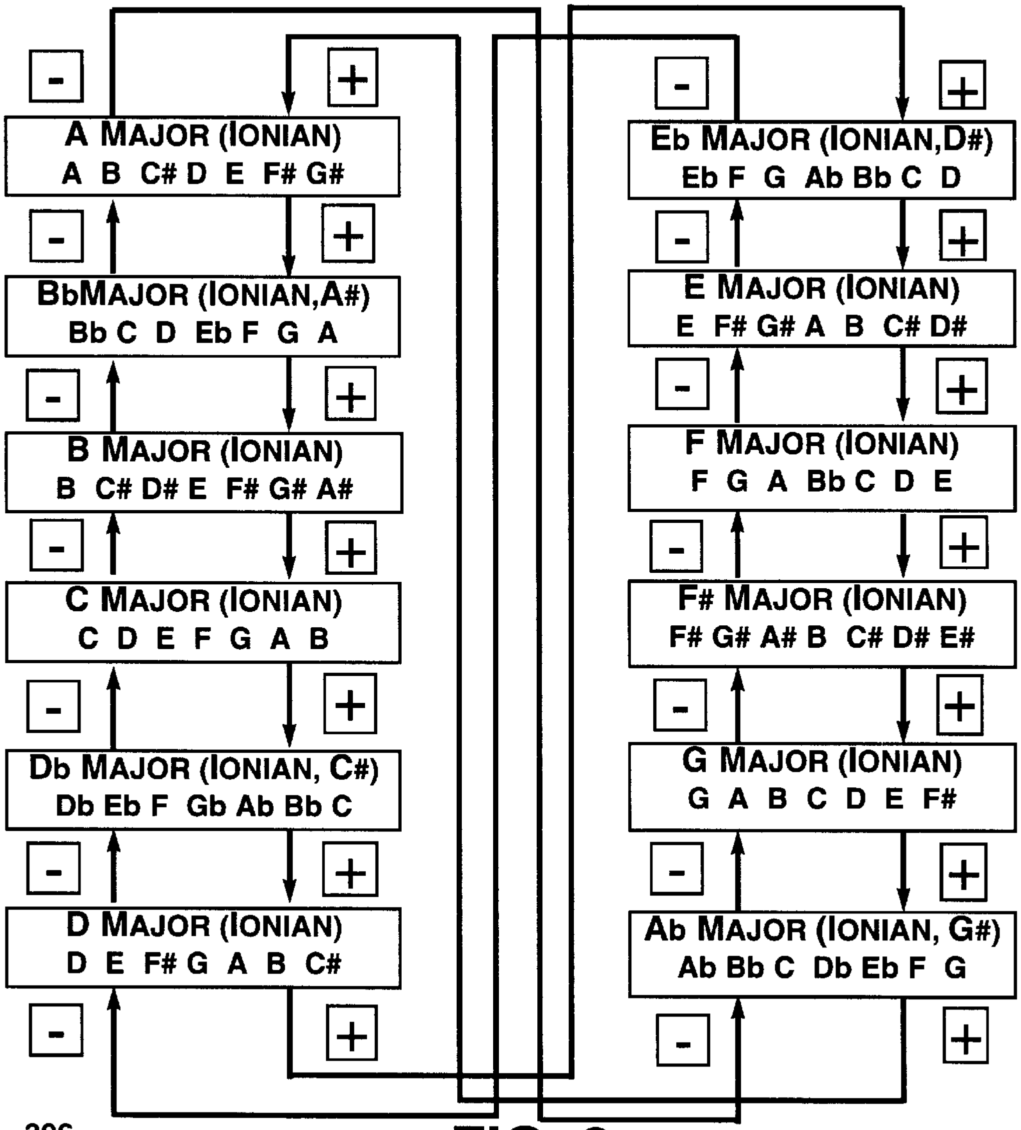
FIG. 6 is a listing of a possible sequence of Major scales which are accessible using the selection of FIG. 5.

2. The user can select a different root note as when a different key signature is contained in the music being played. Referring to FIGS. 5 and 6, actuating the "+" input sensor button 302, one of the two key/note select user buttons, advances the selected scale from C Major to Db Major and reflects the result on display 306. Internally, the MCE control 919 reads the state of input sensor button 302, computes the desired result, displays the desired result on display 306 and begins to interpret any actuated keyboard keys 307 in correspondence to the scale selected. This pattern of action is common to any manner of means to select an active scale (i.e. root note and mode). Actuating "+" again advances the selected scale to D Major. Actuating the "−" input sensor button 303 would drop the selected scale one semitone to Db (flat) Major, and thus the keyboard keys 1 through 8 of FIG. 2 are programmed to Db, Eb, F, Gb, Ab, Bb, C respectively. All twelve root notes are accessible in this described manner. Actuating and holding 302 or 303 serves as a repeat function, allowing a new root note to cycle more rapidly. For example, if the current scale is A Major and Eb Major is desired, the "+" button 302 is actuated and held, causing the scales to more quickly advance to Eb Major. Alternate embodiments are certainly possible, such as, but not limited to, a single key/note selection "jog wheel", a means known in the art, or a mouse pointing device and a larger screen could be used to very rapidly select root note, (for example, all root notes may be displayed on the screen and "clicking" on the desired note selects it) or data entered by means of an optional MIDI input could select the root note. The MCE is not limited by the order of root notes shown in FIG. 6, as alternate orders of the root notes may also have advantages, however the shown order is selected for simplicity; neither is the MCE limited only to the described preferred manner of selecting root notes.

Figure 7:
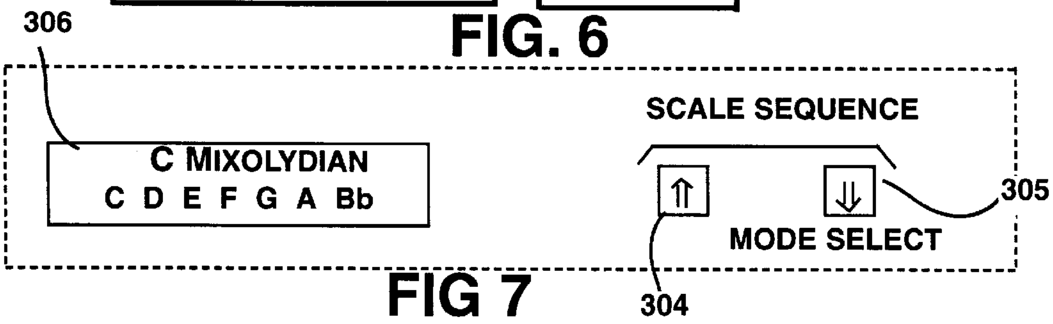
FIG. 7 is a diagram illustrating the preferred embodiment of the means to select the musical mode of the present invention (i.e. Major, Minor, Harmonic minor, Melodic minor, etc.) including the recalling of user-defined scales.
Figure 8A:
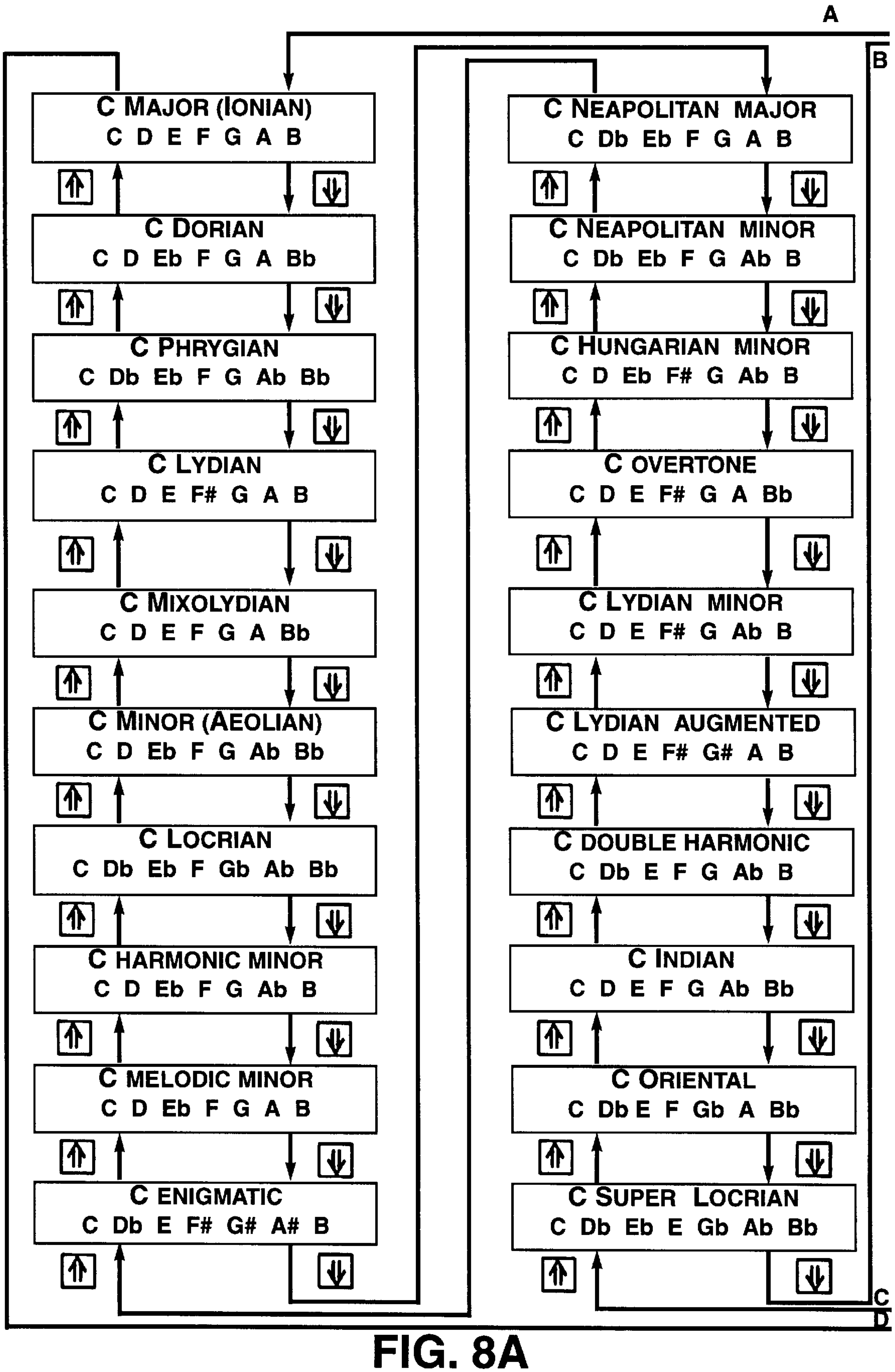
FIG. 8 is a possible sequence of scales with a root note of C which are accessible using the selection of FIG. 7.
Figure 8B:
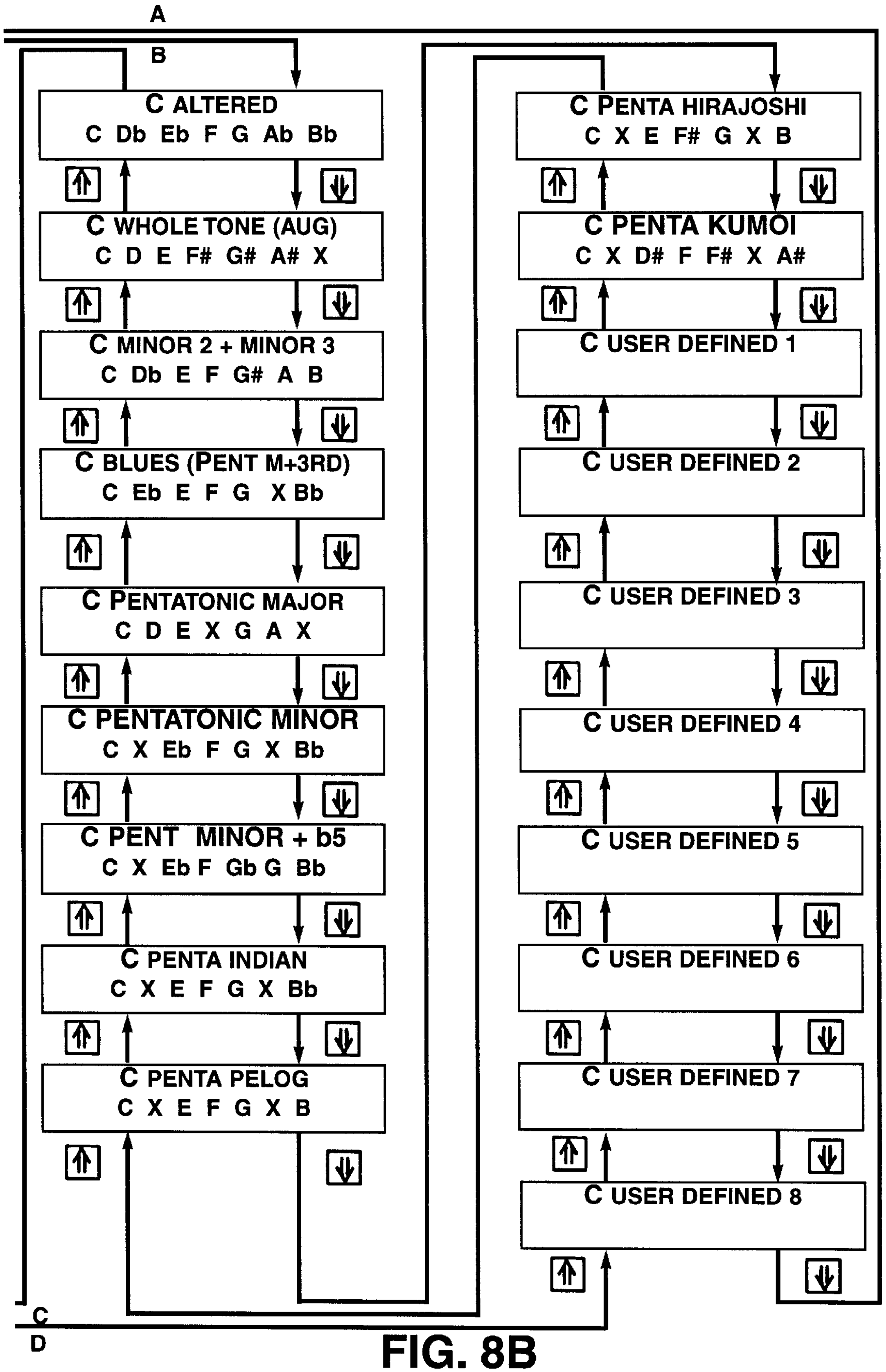

3. The user can select a different scale mode as illustrated by the following example using FIGS. 7 and 8. The two mode select user buttons, 304 and 305 provide the means for the user to select a different scale mode. If the currently selected scale is C Major and C minor is desired, the "↓" input sensor button 305 is actuated to change the selected scale to C Dorian, i.e. the mode is changed but the root note remains the same. The resultant display is shown in FIG. 8 including the root note (which was not changed), the name of the newly-selected mode, the notes which comprise the mode beginning with the root note C in ascending order, and implicitly, which keyboard keys are active and which keys are muted (X would indicated a muted key, i.e. an unused key). Four more actuation's of 305 results in the selection of C Minor, and thus the keyboard keys 1 through 8 of FIG. 2 are programmed to C, D, Eb, F, G, Ab, Bb respectively. Alternate embodiments are certainly possible, such as, but not limited to, a single key/note selection "jog wheel", a means known in the art, or a mouse-pointing device enabling the user to select a mode from a menu displayed on a screen large enough to display multiple, simultaneous choices, or data entered by means of an optional MIDI input could select the mode. The MCE is not limited by the described interface for mode selection or by the order of modes shown in FIG. 8, as alternate orders of the root notes may also have advantages, nor by the number of modes provided. However the shown order of modes is selected to reflect a logical progression of traditional modes, then a looser ordering of other modes using seven notes, six notes and five notes. Many other logical groupings are possible. Referring again to FIG. 8, C Pentatonic minor illustrates how muted keys are reflected in display 306, the notes being C X Eb F G X Bb. This indicates that keyboard keys 1 through 7 (and of course repeating this obvious pattern throughout the remainder of the keyboard) represent C, muted, Eb, F, G, muted and Bb, respectively. Hence neither keys 2 nor 6 cause a musical note to be transmitted on the MIDI output 922. Implicitly, the MCE shows the user what the value of each keyboard key is and which keys are active and which keys are not active (muted).

Figure 9:
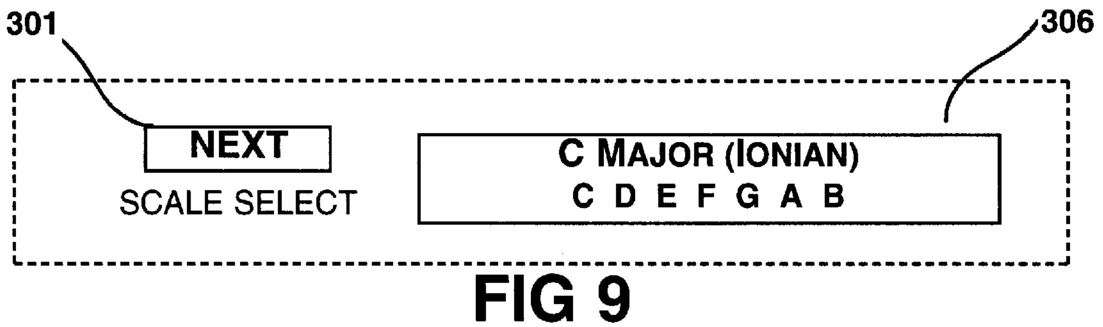
FIG. 9 is a diagram illustrating the preferred embodiment of the means to quickly select a scale from among a group of scales stored in a memory buffer, i.e. a means to quickly make key signature and/or mode changes during a performance.
Figure 10:
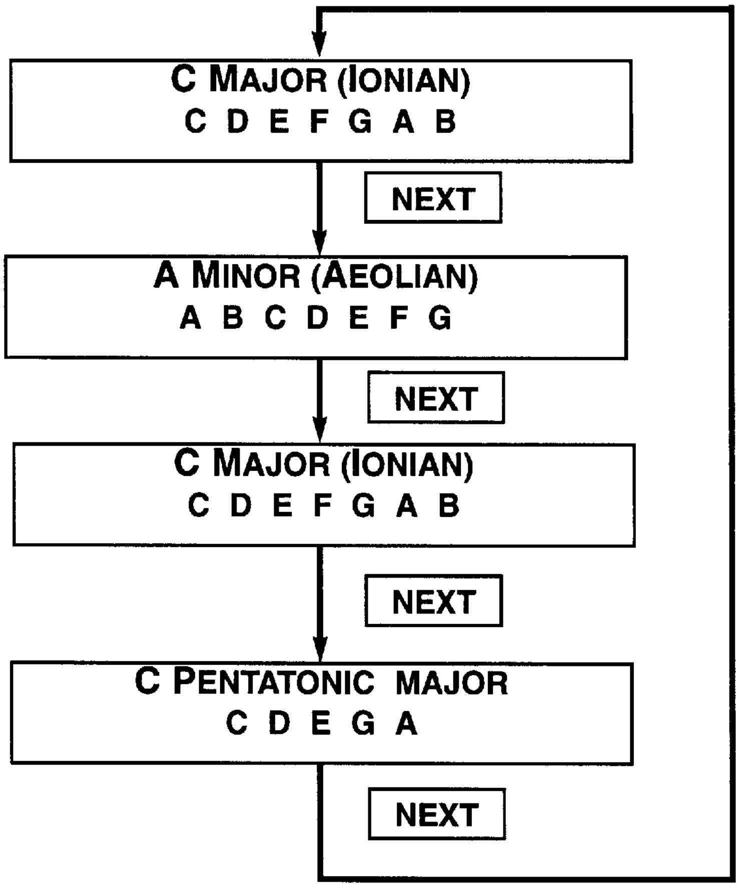
FIG. 10 is a possible sequence of four scales stored in said memory buffer (although four scales is not construed as the memory buffer limit) using the selection of FIG. 9.

4. The scale select interface permits the user to sequentially select from among a group of user-chosen scales which are desired for easy access. The following example of FIG. 9 and FIG. 10 illustrates this concept. FIG. 10 illustrates the circular buffer concept previously described. The user previously has chosen four scales for easy sequential access. If C Major is the current scale selection seen in FIG. 10, after actuating the "NEXT" input sensor button 301, i.e. the scale select button, A Minor becomes the currently selected scale and is displayed on display 306 as shown. Actuating "NEXT" again results in C Major. Actuating "NEXT" again results in C Pentatonic major as the currently selected scale, comprised of notes C, D, E, G and A. Actuating "NEXT" again returns to the start of the sequence at C Major. As with all cases except while defining user-defined scales or while defining the actual scale sequence, the scale displayed on display 306 is also the scale currently active on keyboard keys 307. Although the example shows four scales in the circular memory buffer (915 and 919), this should not be construed as a limitation upon the MCE. Likewise, as in 2. and 3. above, other means can be used to select scales, such as, but not limited to, an optional foot switch contained in 960 of FIG. 15, or a mouse-pointing device in conjunction with a display which can display many more simultaneous characters. The described embodiment is not a limitation upon the present invention.

Figure 11:
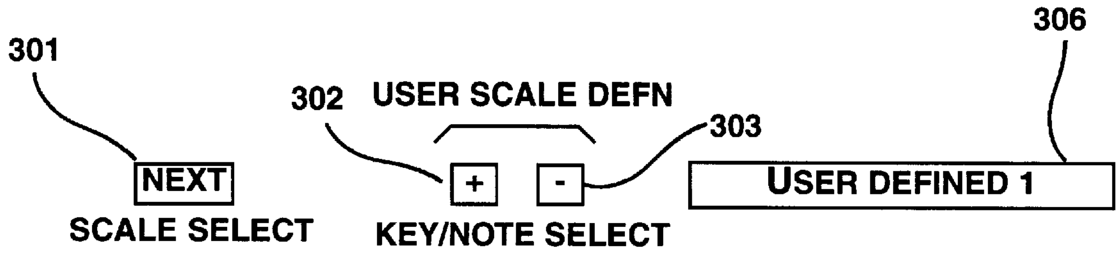
FIG. 11 is a diagram illustrating the preferred embodiment of the means to define the user-defined scales of the present invention, i.e., to enter the notes which comprise the user-defined scales.

5. The user scale-definition interface is shown in FIG. 11. This permits the user to define a scale not already stored in the predefined scale memory. While defining a user-scale, the keyboard keys 307 are not intended to be active in the MCE, although they could remain active in the scale selected prior to entering the user scale-definition. FIG. 12*a* shows a 14 step example resulting in the storage of a seven-note scale under the default title "User defined 1". "+" and "−", 302 and 303, are simultaneously actuated to enter into user scale definition mode, resulting in a screen display on item 306, which reminds the user about how to perform said scale definition. Entering "+" calls up the default starting note, i.e., the root note which was active prior to entering into user scale definition. This example assumes that root note was C. C is the intended root note in this example also. Actuating 'NEXT', 301, accepts C as part of the user-defined scale and displays the next note, C# (sharp). (Optionally, an interface may be provided that allows the user to choose if sharps or flats should be used in this ascending sequence of note selection although that detail is not essential to the MCE definition.) C# is not desired. "+" is actuated, advancing C# to D. Actuating "NEXT" accepts D as part of the user-defined scale and displays the next note, D#. Actuating "+" twice followed by "NEXT" accepts F as the next note and advances to F#. Actuating "NEXT" again accepts F#. Actuating "+" followed by "NEXT accepts G# as the next note. Actuating "NEXT" again accepts A. Actuating "+" advances to B. At this point in the sequence, the user can either actuate "NEXT" to accept B, and since there are no more unique notes, user scale definition is complete and a save and exit results, or, the user can actuate "−" to indicate that the seventh key in the sequence shall be muted, or the user can simultaneously actuate "+" and "−", the normal way to exit the mode and save results. Upon exiting the scale definition, the notes are saved in the user-defined scale memory 913 under the title User defined 1.

Seeing the display contents shown at sequence 14, namely "User defined 1" without the "entry?" text, confirms that this note combination has been saved. See 5. below for further discussion. Under said title, the notes can be later recalled and transposed in accordance with the interface described in FIG. 6 and text describing the operation of FIG. 6 (2. above). Actually, the precise notes entered do not need to be saved, but rather the intervals between the notes is the important information. Any root note can be assigned as the first note. However, insofar as the user is concerned, it appears that the notes entered by the user comprises the stored information. Either concept, storing the notes or storing the intervals between the notes can accomplish the same desired result. It is actually preferred to store the interval information, since that simplifies the task described in 6. below. FIG. 12*b* illustrates a second example sequence of keystrokes, showing how the "−" is used to mute every keyboard key which would otherwise be the fourth note of every octave. FIG. 12*c* shows another case in which the user desires to enter a scale that does not start with the keyboard's currently valid root note. In this example, it is assumed that the currently selected root note is C. The user enters scale definition as before and actuates the "−" button three times followed by actuating "NEXT", resulting in A as the root note for the new scale definition. This saves the user the task of transposing the notes before entering them into the MCE.

6. As further assistance to the novice musician, this same interface described in 5. above can be used to assist in selecting an appropriate scale already contained in the MCE, whether in the predefined scale memory or in the user-defined scale memory. Upon exiting after a user-defined scale is defined, the control 919 initiates a search through predefined scale memory 911 and user-defined scale memory 913 to check for duplication of the note patterns. By note patterns is meant the interval (in semitones) between the notes of the scale. For example, The note intervals of the C Major scale are 2 (from C to D), 2 (from D to E), 1 (from E to F), 2 (from F to G), 2 (from G to A), 2 (from A to B) and 1 (from B to C). In fact, this is the definition of a Major scale. If the user was unsure which scale to choose for a particular piece of music, the user could look through the music, enter the notes used into one of the user-defined scale memories, and then upon exiting, if the MCE matches the pattern of intervals to a scale already entered, the displayed result shown in FIG. 12*a* sequence 14 (for example) is not what is displayed, but rather the scale found to match the current user entry is displayed. For example, if the final result in sequence 13 of FIG. 12*a* were the notes C, D, E, F, G, A, B, sequence 14 would display the following:

C Major (Ionian) C D E F G A B indicating that the entered notes match to the root note C and Major or Ionian mode. This serves as the indication to the user that the notes entered correspond to an existing scale and what that scale is. This can be a tremendous benefit to any musician, but especially the novice.

7. The scale sequence interface is shown in FIG. 13. FIGS. 14*a* through 14*c* shows an example of how a sequence of scales is entered. This permits the user to later cycle through a sequence of scales with a single key actuation. FIGS. 14*a* through 14*c* show a 46-step example resulting in the storage of the four scale sequence used in the example of FIG. 9. "↑" and "↓", 304 and 305 of FIG. 13, are simultaneously actuated to enter into scale sequence definition mode, resulting in a screen display which reminds the user about how to perform said scale sequence definition. Entering "↓" calls up the default starting scale, i.e. the root note and mode which was active prior to entering into scale sequence definition. This example assumes that root note was C and the mode was Major. C Major is the intended first scale in this example. Actuating "NEXT", 301, accepts C Major as the first scale in this sequence and displays the next mode, C Dorian. "↓" is actuated four times, resulting in C Minor being displayed, but A Minor is the next desired scale. "−" is actuated three times which decrements the root note such that A Minor is selected. "NEXT" is actuated to enter A Minor as the next scale in the sequence, shown at sequence 11 of FIG. 14*a*. The example continues until the last desired scale is entered at sequence 46 in FIG. 14*c*. Scale sequence definition mode is exited by simultaneously actuating "↑" and "↓". As previously described, this process of stepping through root notes and modes can be accelerated by pressing and holding the various described buttons (301–305 as appropriate). The described implementation should not be construed as a limitation of the present invention. For example, a mouse pointing device and a display device large enough to simultaneously show all modes and all root notes could be used to very rapidly select the scale sequences, albeit a presently more expensive implementation. A single rotary device such as a "jog wheel"

could replace the "↑" and "↓" buttons, etc. A 4×24 LCD display could allow the user to visualize more moves at a time. The essential concept is the same regardless of a myriad possible implementations. Actually, the precise scale names do not have to be stored in memory 915, but rather a code uniquely indicating which scale and root note is desired to be referenced. There are only twelve possible root notes, and only thirty-nine possible modes described in the MCE, although as mentioned, the thirty-nine modes is not to be considered a limitation placed upon the present invention. Thus, as few as 9 binary bits of storage permit unique referencing of the 12×39=468 possible scales shown in the MCE. This technique minimizes the required memory size for storing scale sequence information. Note that the described embodiment makes no provision for editing the scale sequence but rather forces the user to enter an entirely new sequence. This is not to be construed as a limitation to the present invention. Such an editing feature is desirable but non-essential to the description of the MCE. Also, being able to select from among a number of different stored scale sequences is desirable, but again is not vital to the essential concept of the present invention. Also, the ability to save sequences of scales and/or user-defined scales under more user-friendly titles such as the name of a song is desirable and the absence of such a description is not a limitation upon the present invention.

8. Musical notes are initiated by selecting or actuating keyboard keys (307 of FIG. 4 and 901 of FIG. 15) in accordance with the selected scale which appears on the display (306, 905). The keyboard key operator 901 passes key actuation/release information via output 902 to internal bus 921 to bi-directional interface 920 to control 919. Control 919, which in communication with memory items 911 and 913 and 915, computes corresponding note information. Note information is sent from control 919 via bi-directional interface 920, then internal bus 921, then interface 918 (which as previously mentioned may be an input interface or a bi-directional interface) to MIDI interface 917. MIDI interface 917 communicates note information to external MIDI devices such as sequencers and sound modules via MIDI output interface 922.

2. RICH CONFIGURATION EMBODIMENT

Figure 16:
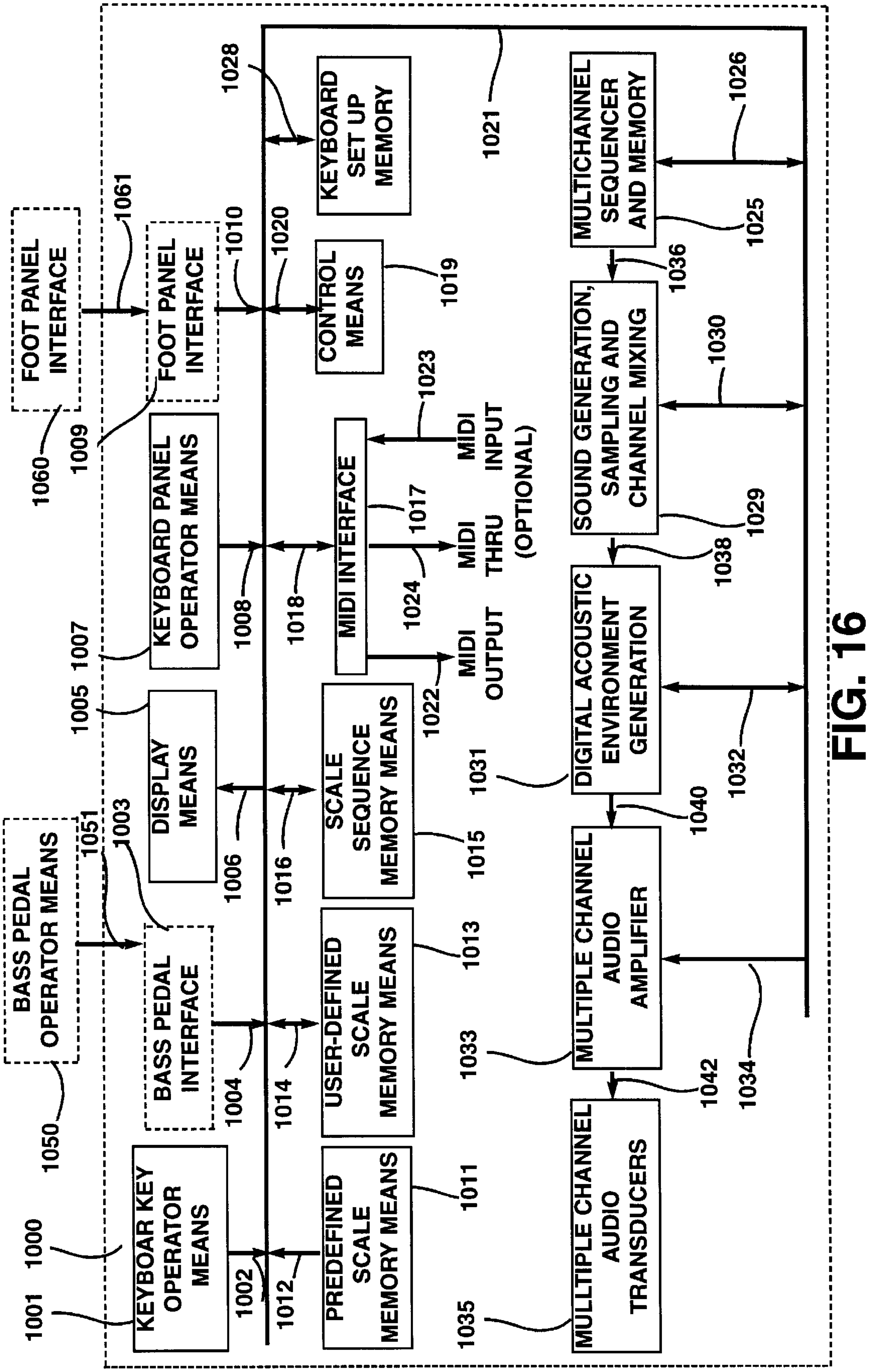
FIG. 16 is a block diagram illustrating the rich configuration embodiment (RCE) keyboard preferred embodiment of the present invention.

The rich configuration embodiment (RCE) block diagram, shown in FIG. 16 comprises the MCE and a number of additional functional units. The purpose of describing an embodiment with greater integration of functional units is to demonstrate that the fundamental concepts of the present invention extend to all manner of keyboard musical instruments or alternate representations thereof, such as, but not limited to, keyboard interface simulated on the screen of a personal computer. The units are described as follows.

Keyboard key operator 1001 is the same as 901 as described previously. Keyboard key operator 1001 passes output information on output interface 1002 which is in communication with internal bus 1021.

Bass pedal interface 1003 contains input circuitry which accepts pedal actuation information from bass pedal operator 1050 via output 1051. Pedal actuation information consists of data representing which pedals are being activated, and optionally how hard and/or how quickly a pedal is actuated or released. Output interface 1004 contains output circuitry which provides the pedal actuation information to the other internal functional units via internal bus 1021. Bass pedal interface 1003 also contains input circuitry which accepts foot sensor data from bass pedal operator 1050 via output 1051. This additional data comprises such information as bass pedal voice selection. For example, the bass pedals are not restricted for use as a bass instrument only, but can be any available voice such as percussion or lead saxophone.

Display 1005 consists of a graphics display device capable of displaying all root note choices, all mode choices, and which can provide user-friendly menus for selecting and assigning voices, acoustic environment, rhythm, etc. The preferred embodiment is a high resolution liquid crystal display (LCD), although this should not be construed as a limit placed upon the MCE. The display receives the information to be displayed using input interface 1006 which is in communication with internal bus 1021.

Keyboard panel operator 1007 consists of various input means to allow the user to quickly make root note, mode, voice, acoustic environment, rhythm, etc. choices. The preferred embodiment is a rotary-type input sensor for root note selection (and to aid in user scale definition), a rotary-type input sensor for mode selection (and to aid in user scale definition), a rotary-type input sensor for the remaining choices, all using a menu-driven system. Operator 1007 in communication with internal bus 1021 via output 1008.

Foot panel interface 1009 contains input circuitry which accepts data from the foot panel operator 1060 by way of output 1061. Foot panel information consists of data representing such information as, but not limited to, scale selection, key/note selection, mode selection, volume, sustain, breath, etc. Output interface 1010 provides foot panel information to the other functional units.

Predefined scale memory 1011, user-defined scale memory 1013 and scale sequence memory 1015 operate as in the MCE description (items 911, 913 and 915 respectively). These units are all in communication with internal bus 1021 via interfaces 1012, 1014 and 1016 respectively.

MIDI interface 1017 operates in the same manner as 917 in the MCE description. MIDI through and MIDI input are not optional but rather are always provided.

Control 1019 is preferably a microcontroller and facilitates internal communication and control of all functional units. It is in communication with internal bus 1021 via bi-directional interface 1020.

Keyboard setup memory 1027 provides a means to save all voice, acoustic, scale, and other information pertaining to recalling keyboard settings such that the same sound is reproducible in future sessions. Memory 1027 is in communication with internal bus 1021 via bi-directional interface 1028. The keyboard setup store and recall functions constitute part of the previously described user-friendly interface.

A multi-channel sequencer and memory 1025 is in communication with bus 1021 via bi-directional interface 1026. The multi-channel sequencer permits storing and recalling files of musical notes for the purpose of saving and playing back music. It permits the combining of notes currently being played on the keyboard keys with previously stored notes transposed to the currently selected scale. The preferred memory means is a combination of volatile memory such as DRAM and non-volatile memory such as a floppy disk drive or a hard disk drive, although other memory types may also be used. A sequencer user interface, part of the previously mentioned user-friendly interface, facilitates easy storing and recalling of said files. The output of sequencer 1025 is provided via output interface 1036 to the sound generation 1029 rather than using bus 1021 because of the high volume of data.

Sound generation, sampling and channel mixing 1029 is in communication with bus 1021 via bi-directional interface 1030. It accepts the bulk of its input information from output

1036. Unit 1029 incorporates a memory means which stores information that is used to construct sounds. Unit 1029 converts note and voice information from the multi-channel sequencer, using said memory means. It combines the various voices in a user-determined ratio (known as audio mixing) as requested by user interface 1027 and outputs the resultant sound data via output interface 1038 to the digital acoustic environment generation 1031.

The Digital acoustic environment generation 1031 is in communication with bus 1021 via bi-directional interface 1032. This unit uses digital signal processing techniques to create the illusion of different acoustic environments such as various room sizes, various room liveliness factors, echo effects, reverb effects, etc. Commands are received from bus 1021. Audio input data is received from sound generation, sampling and mixing 1029 from output 1038. Unit 1031 outputs multiple channel audio data via output interface 1040.

Multiple channel audio amplifier 1033 receives multiple channel audio data from output 1040. It provides a headphone interface and also amplifies audio data so that audio output can be reproduced by audio transducers 1035 via output interface 1042.

Multiple channel audio transducers 1035 receives multiple channel amplified audio from output interface 1042 and converts the audio information into sound.

3. BASS PEDAL EMBODIMENT (BPE)

Figure 17:
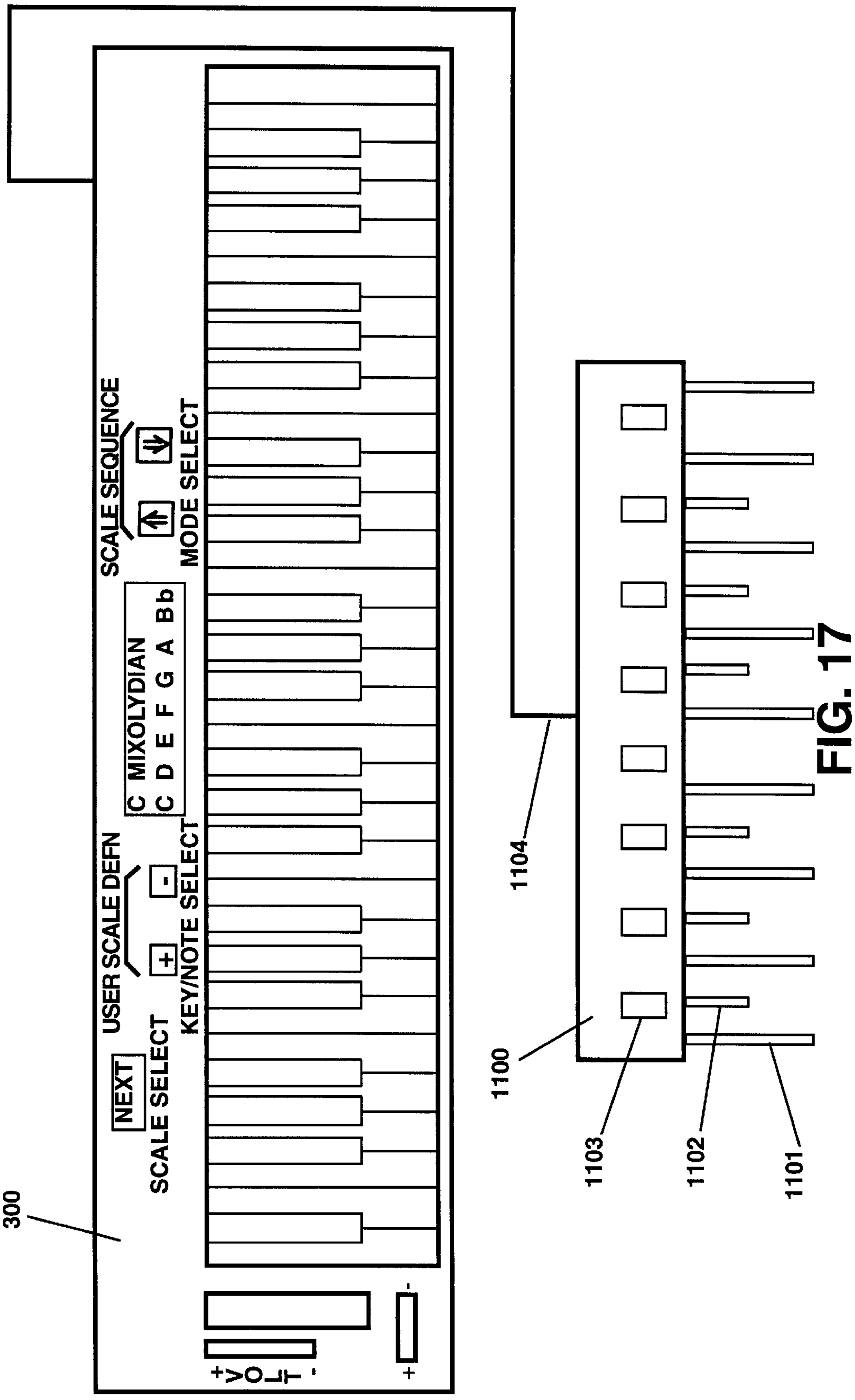
FIG. 17 is a diagram illustrating the preferred embodiment of a bass pedal implementation using the seven note per octave concept of the present invention and shown connected to the keyboard of FIG. 4.

A description of a bass pedal implementation is included to demonstrate that the concept of the seven keys per octave of present invention can be applied to musical instruments other than keyboards, although bass pedals originated for supplementary use with keyboard-style devices. FIG. 17 shows the bass pedal preferred embodiment 1100 in communication with the MCE 300 by bass pedal output 1104. The bass pedal preferred embodiment consists of a plurality of pedals 1101 and 1102 arranged in a repeating pattern of seven pedals, in accordance with the seven keys per octave concept of the present invention. A plurality of Input sensors 1103, such as switches, permits foot selection of any variable operating features which may be desired.

Figure 18:
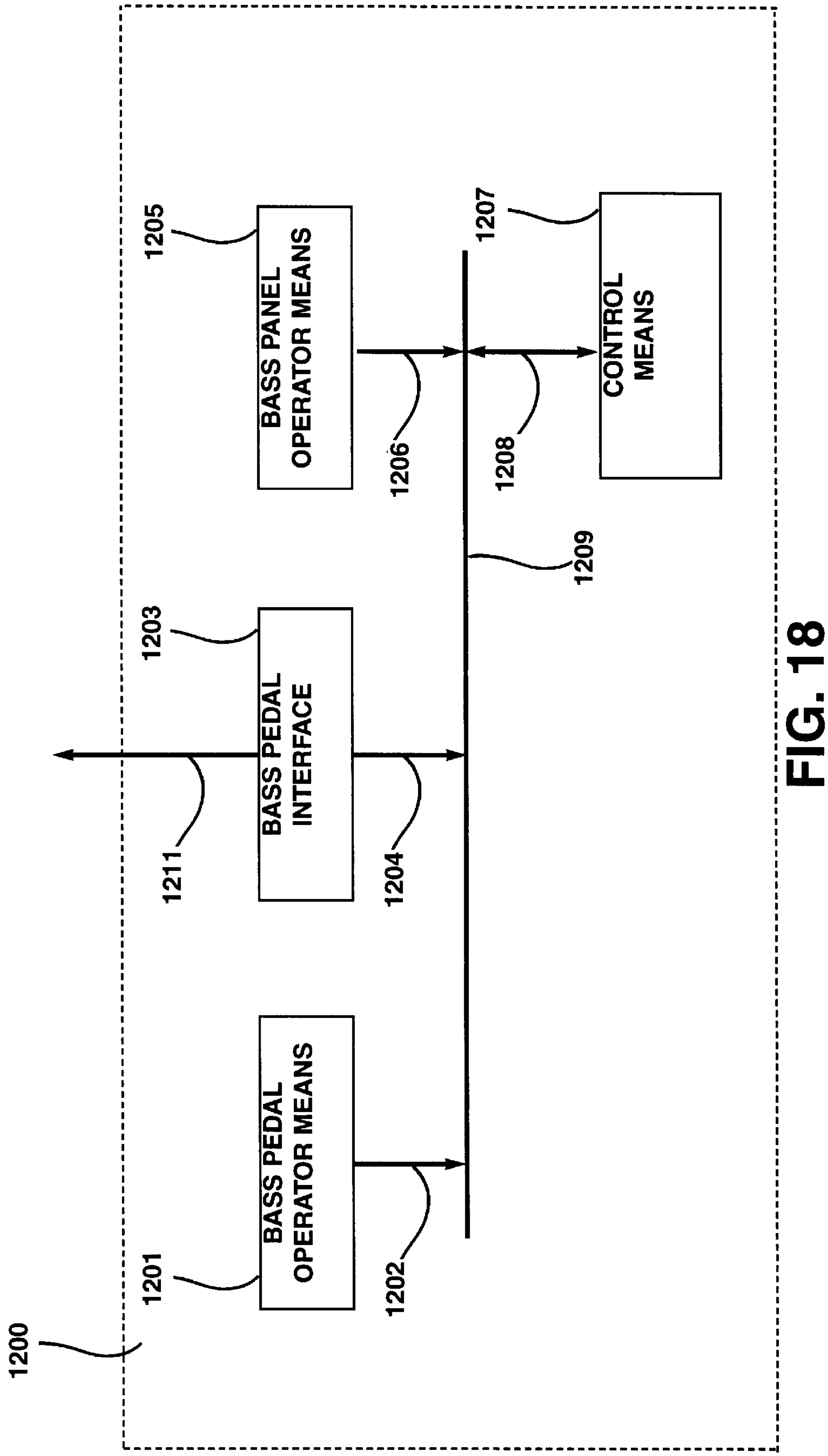
FIG. 18 is a block diagram defining the preferred embodiment of the bass pedal option embodiment (BPE) referenced in FIGS. 10 and 11.

FIG. 18 illustrates the internal workings of the bass pedal implementation 1200. A control 1207 receives pedal actuation information from bass pedal operator 1201 (refer to pedals 1101 and 1102 of FIG. 17) by means of bass pedal operator output interface 1202, internal bus 1209 and bi-directional interface 1208. Control 1207 also receives bass panel operator inputs (refer to input sensors 1103) from output interface 1206, internal bus 1209 and bi-directional interface 1208. Note information and user foot selection information is sent from control 1207, via interface 1208, bus 1209, input interface 1204 to bass pedal interface 1203. Bass pedal interface 1203 outputs said information via output interface 1211 to the keyboard. It should be noted that bass pedal interface 1203 could be implemented using a MIDI interface such as 1017–1023 of FIG. 16 although the interface need not be as complex as a MIDI interface.

SUMMARY

4. The minimum configuration embodiment and accompanying descriptions demonstrate that the concept of using seven keys per octave and electronically mapping said keys to the notes of a scale constitutes a dramatic simplification in the art of learning, performing and composing music.

The rich configuration embodiment employs the essential concepts of the present invention and demonstrates how the concepts can combine with other devices to produce a stand-alone complex music workstation. A similar end result can be achieved by combining the MCE with external units which take the place of the additional units described in the RCE although there are distinct advantages of integrating the functional units together. Such advantages include: reduced complexity for the user, rapid setup of equipment and equipment state, etc.

The essential concept of the present invention can be applied to other musical instruments such as bass pedals, or any other instrument in which there is opportunity to electronically remap the user inputs to musical notes.

While there is shown and described the present preferred embodiment of the invention, it is to be distinctly understood that this invention is not limited thereto but may be variously embodied to practice within the scope of the following claims.

We claim:

1. An electronic musical keyboard instrument or representation thereof which comprises;

- a plurality of repeating recognizable patterns of seven keys of a first and a second type, which are capable of actuation, and arranged as first type-second type-first type-second type-first type-second type-first type;
- a plurality of electronic signals, each assigned to a valid musical note;
- a plurality of selectable stored scales of valid notes in repeating patterns of octaves for matching assignment of valid notes to the repeating patterns of seven actuatable keys;
- a means for selecting a scale with valid notes, from the plurality of stored scales;
- a means of electronically assigning the keys of the keyboard to the valid notes of the selected scale, such that the seven keys of any repeating pattern of seven keys on the keyboard play only the valid notes of the selected scale;
- means for detecting when a selected key is actuated; and
- means for generating the electronic signal assigned to a valid note, when the means for detecting when a key is actuated detects the actuation of a key;
- a means of electronically assigning the keys of the keyboard to the valid notes of the selected scales, such that the patterns of keys play the same associated chords in any selected scale.

2. The keyboard of claim 1 wherein the first type of key is a different color than the second type of key.

3. The keyboard of claim 2 wherein the first type of key is white and the second type of key is black.

4. The keyboard of claim 1 wherein the first type of key is a different shape than the second type of key.

5. The electronic musical keyboard instrument of claim 4 which further comprises a means of displaying which scale is selected.

6. The electronic musical keyboard instrument of claim 4 which further comprises a means of displaying what are the valid notes of the pre-selected scale.

7. The electronic musical keyboard instrument of claim 4 which further comprises a means of displaying which keys are assigned to which notes.

8. The electronic musical keyboard instrument of claim 7 wherein the means of displaying scale information is a digital display.

9. The electronic musical keyboard instrument of claim 7 which further comprises a means of displaying which keys of a scale are not assigned to a note.

10. The electronic musical keyboard instrument of claim 4 which further comprises a means of designating a group of scales for later access.

11. The electronic musical keyboard instrument of claim 10 which further comprises a means to access said designated group of scales.

12. The electronic musical keyboard instrument of claim 11 wherein the means of designating a group of scales for quick access are displayed by a display device.

13. The electronic musical keyboard instrument of claim 4 wherein the method for selecting a scale comprises selecting a root note and a mode.

14. The electronic musical keyboard instrument of claim 13 wherein the means for selecting a root note and a mode is a digital input device and a digital display.

15. The electronic musical keyboard instrument of claim 14 wherein the digital display device is a 2 line by 24 character liquid crystal display.

16. The electronic musical keyboard instrument of claim 13 wherein the means for selecting a root note and a mode is a rotary type input sensor.

17. The electronic musical keyboard instrument of claim 13 wherein the means for selecting a root note and a mode is a mouse.

18. The electronic musical keyboard instrument of claim 4 which further comprises a means to allow playback and overlay of one track over another.

19. The electronic musical keyboard instrument of claim 18 wherein the means to allow playback and overlay of one track over another is a multi channel sequencer.

20. The electronic musical keyboard instrument of claim 4 which further comprises a means of adjusting the sound output of the instrument to account for and simulate different room sizes, room liveliness, echo conditions, and reverberation effects.

21. The electronic musical keyboard instrument of claim 4 which further comprises a MIDI sequencer.

22. The electronic musical keyboard instrument of claim 4 wherein the keys of the keyboard can be associated with notes which simulate the notes made by a plurality of instruments.

23. The electronic musical keyboard instrument of claim 4 which further comprises a plurality of recognizable repeating patterns of seven bass pedals of either a first type or a second type, capable of activation, and arranged first type-second type-first type-second type-first type-second type-first type;

a plurality of selectable stored scales and associated chords of valid notes in repeating patterns of octaves for matching assignment of valid notes to the repeating patterns of seven actuatable bass pedals;

a means for selecting a scale with valid notes, from the plurality of stored scales;

a means for detecting that a selected bass pedal is actuated;

a means of electronically assigning the bass pedals to the valid notes of the selected scale, such that the seven pedals of any repeating pattern of seven pedals on the keyboard play only the valid notes of the selected scale;

a means of electronically assigning the bass pedals to the valid notes of the selected scales, such that patterns of bass pedals play the same associated chords in any selected scale.

24. The keyboard of claim 23 wherein the first type of key is a different color than the second type of pedal.

25. The keyboard of claim 23 wherein the first type of pedal is white and the second type of pedal is black.

26. The keyboard of claim 23 wherein the first type of pedal is a different shape than the second type of pedal.

27. The electronic musical keyboard instrument of claim 23 wherein the means for detecting that a bass pedal is actuated also detects how hard and or how quickly the bass pedal is actuated and deactuated.

28. An electronic musical keyboard instrument or representation thereof which comprises;

a plurality of repeating recognizable patterns of seven keys of a first and a second type, which are capable of actuation, and arranged as first type-second type-first type-second type-first type-second type-first type;

a plurality of electronic signals, each assigned to a valid musical note;

a plurality of selectable stored scales of valid notes in repeating patterns of octaves for matching assignment of valid notes to the repeating patterns of seven actuatable keys;

a means for selecting a scale with valid notes, from the plurality of stored scales;

a means of electronically assigning the keys of the keyboard to the valid notes of the selected scale, such that the seven keys of any repeating pattern of seven keys on the keyboard play only the valid notes of the selected scale;

means for detecting when a selected key is actuated; and means for generating the electronic signal assigned to a valid note, when the means for detecting when a key is actuated detects the actuation of a key.

29. The keyboard of claim 28 wherein the first type of key is a different color than the second type of key.

30. The keyboard of claim 29 wherein the first type of key is white and the second type of key is black.

31. The keyboard of claim 28 wherein the first type of key is a different shape than the second type of key.

32. The electronic musical keyboard instrument of claim 28 wherein the means for detecting that a key is actuated further includes means for detecting how hard and or how quickly said key is actuated and deactuated.

33. The electronic musical keyboard instrument of claim 29 which further comprises a means of manually identifying the notes of a scale.

34. The electronic musical keyboard instrument of claim 33 wherein the means of manually identifying the notes of a scale is a digital display device.

35. The electronic musical keyboard instrument of claim 33 wherein the means of manually identifying the notes of a scale is a rotary type input sensor.

36. The electronic musical keyboard instrument of claim 33 wherein the means of manually identifying the notes of a scale is a mouse.

37. The electronic musical keyboard instrument of claim 33 which further comprises a means of storing the manually identified notes of a scale.

38. The electronic musical keyboard instrument of claim 37 wherein the means of storing the manually identified notes of a scale is electronic memory.

39. The electronic musical keyboard instrument of claim 33 which further comprises a means of comparing the notes of a manually recorded scale with the notes of stored scales.

40. The electronic musical keyboard instrument of claim 39 wherein the results of the means of comparison of the notes of a manually recorded scale with the notes of stored scales is displayed by a digital display device.

* * * * *